United States Patent
Faaborg et al.

(10) Patent No.: US 9,383,827 B1
(45) Date of Patent: Jul. 5, 2016

(54) MULTI-MODAL COMMAND DISPLAY

(71) Applicant: Google Inc., Mountain View, CA (US)

(72) Inventors: Alexander Faaborg, Mountain View, CA (US); Daniel Marc Gatan Shiplacoff, Los Altos, CA (US); Thomas Ramon Karlo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 14/246,458

(22) Filed: Apr. 7, 2014

(51) Int. Cl.
 *G06F 3/02* (2006.01)
 *G06F 3/023* (2006.01)
 *G06F 3/16* (2006.01)

(52) U.S. Cl.
 CPC .............. *G06F 3/023* (2013.01); *G06F 3/167* (2013.01)

(58) Field of Classification Search
 CPC ............. G06F 3/01; G06F 3/02; G06F 3/023; G06F 3/0489; G06F 3/04895; G06F 3/04897; G06F 3/16; G06F 3/167
 USPC ......................................................... 345/168
 See application file for complete search history.

(56) References Cited

U.S. PATENT DOCUMENTS

| 7,624,356 | B1 | 11/2009 | Rockey et al. |
| 2006/0111890 | A1* | 5/2006 | Mowatt ..................... G06F 3/16 704/3 |
| 2010/0312547 | A1 | 12/2010 | Van Os et al. |

OTHER PUBLICATIONS

"Context Menu", Retrieved from Wikipedia, the free encyclopedia [online]: First Accessed on Jan. 9, 2014 <http://en.wikipedia.org/wiki/Context_menu.htm> 3 pp.

"Hotkeys (Mouse, Joystick and Keyboard Shortcuts)", AutoHotkey [online]. First Accessed on Jan. 9, 2014. Retrieved from the Internet: <http://www.autohotkey.com/docs/Hotkeys.htm> 4 pp.

"KeyCue—Features", ergonis [online]. First Accessed on Jan. 9, 2014. Retrieved from the Internet: <http://www.ergonis.com/products/keycue/features.html> 4 pp.

NDTV Gadgets, New software developed to help users learn keyboard shortcuts, Press Trust of India, Oct. 9, 2013, 2 ppages.

"Cloverfield, OS X Context Sensitive Shortcut Cheatsheets," by Adrian, Oct. 21, 2012 [online]. First Accessed on Jan. 9, 2014. Retrieved from the Internet: <http://www.cloverfield.com.au/os-x-context-sensitive-shortcut-cheatsheets/> 6 pp.

"Watching: Setting up context shortcuts", lynda.com [online]. First Accessed on Jan. 9, 2014. Retrieved from the Internet: <http://www.lynda.com/InDesign-tutorials/Setting-up-context-shortcuts/656/420404.html> 3 pp.

\* cited by examiner

*Primary Examiner* — Gustavo Polo

(74) *Attorney, Agent, or Firm* — Shumaker & Sieffert, P.A.

(57) ABSTRACT

A computing device includes at least one processor and at least one module, operable by the at least one processor to receive indications of user input comprising a selection of at least one key of a keyboard and at least one other user input, determine, based at least in part on the indications of user input, that the user input collectively indicates a command for execution of at least one operation, and, responsive to determining that the user input collectively indicates the command, determine that the command is alternatively indicated by a particular audio input. The at least one module may be further operable, responsive to determining that the command is alternatively indicated by the particular audio input, to output, for display, a visual representation of the particular audio input, and execute, based at least in part on the command, the at least one operation.

20 Claims, 7 Drawing Sheets

MULTI-MODAL COMMAND DISPLAY

BACKGROUND

Computing devices may be able to receive input from a variety of different types of input devices, such as a keyboard, a mouse, a presence-sensitive input device, a microphone, or other devices. Some inputs can be used to provide a command that causes an application or operating system of the computing device to perform operations. For instance, a particular command can be input by using a mouse to navigate a cursor through various menus output for display as part of a graphical user interface (GUI). Some commands may also be input by using shortcuts, such as keyboard shortcuts. For example, a user might be able to input the particular command by selecting specific keys of a keyboard at the same time.

While there may be multiple, different commands for interacting with an application, the user may be unaware of the different types of input (e.g., touch, audio, video) that he or she can use to input the commands. Moreover, some commands may be indicated by different inputs in different situations, such as in different operating modes of the computing device and/or in different applications. While using shortcuts and different forms of input may improve productivity, a user that is unaware of such shortcuts and forms of input may not realize such gains in productivity.

SUMMARY

In one example, a method includes receiving, by a computing device, a plurality of indications of user input comprising a selection of at least one key of a keyboard and at least one other user input, determining, by the computing device and based at least in part on the plurality of indications of user input, that the selection of the at least one key of the keyboard and the at least one other user input collectively indicate a command for execution of at least one operation, and, responsive to determining that the selection of the at least one key and the at least one other user input collectively indicate the command, determining, by the computing device, that the command is alternatively indicated by a particular audio input. The method may further include, responsive to determining that the command is alternatively indicated by the particular audio input, outputting, by the computing device and for display, a visual representation of the particular audio input and executing, by the computing device and based at least in part on the command, the at least one operation.

In another example, a computing device includes at least one processor; and at least one module, operable by the at least one processor to receive a plurality of indications of user input comprising a selection of at least one key of a keyboard and at least one other user input, determine, based at least in part on the plurality of indications of user input, that the selection of the at least one key of the keyboard and the at least one other user input collectively indicate a command for execution of at least one operation, and, responsive to determining that the selection of the at least one key and the at least one other user input collectively indicate the command, determine that the command is alternatively indicated by a particular audio input. The at least one module may be further operable by the at least one processor to, responsive to determining that the command is alternatively indicated by the particular audio input, output, for display, a visual representation of the particular audio input and execute, based at least in part on the command, the at least one operation.

In another example, a computer-readable storage medium is encoded with instructions that, when executed, cause at least one processor to receive a plurality of indications of user input comprising a selection of at least one key of a keyboard and at least one other user input, determine, based at least in part on the plurality of indications of user input, that the selection of the at least one key of the keyboard and the at least one other user input collectively indicate a command for execution of at least one operation, and, responsive to determining that the selection of the at least one key and the at least one other user input collectively indicate the command, determine that the command is alternatively indicated by a particular audio input. The computer-readable storage medium may be further encoded with instructions that, when executed, cause the at least one processor to, responsive to determining that the command is alternatively indicated by the particular audio input, output, for display, a visual representation of the particular audio input and execute, based at least in part on the command, the at least one operation.

The details of one or more examples are set forth in the accompanying drawings and the description below. Other features, objects, and advantages will be apparent from the description and drawings, and from the claims.

DETAILED DESCRIPTION

In general, this disclosure is directed to techniques for outputting a visual representation of an audio input that indicates a particular command. This output can be responsive to receiving other input that indicates the particular command (such as input received at a keyboard or other suitable input device). By outputting the visual representation of the audio input, techniques of the disclosure may inform users of alternative ways of providing input that indicates a command and thereby assist users in the learning and use of shortcuts or other ways to indicate a desired command. That is, outputting a representation of an alternative form of input at approximately the same time that a user provides input indicating a command may enable the user to more quickly learn different forms of input usable to interact with a multi-modal input system (e.g., a system that allows both audio input and other input (such as touch input) to indicate the same command).

In some aspects, techniques of the present disclosure may enable a computing device to assist users in learning voice commands by displaying a visual representation of audio input, usable to indicate a command, in response to receiving another form of input (such as a keyboard shortcut) that also inputs the same command. That is, the computing device may receive one or more indications of input (e.g., a combination of key presses that comprise a shortcut) that correspond to a command. Responsive to receiving input indicating a command, the computing device may be configured to perform one or more operations. The computing device may also perform the same or similar set of operations when a particular audio input is received. That is, both the keyboard shortcut and the particular audio input may each be mapped to a single command. To inform the user that an audio input alternative exists for inputting the command, the computing device may output a visual representation of the audio input for display. Consequently, in subsequent situations in which the user desires to input the command, the user may be more likely to remember the corresponding audio input and/or use the audio input. In this way, a computing device configured in accordance with the techniques described herein may improve user efficiency by improving the user's recollection of voice commands for subsequent use. Furthermore, techniques of the disclosure may provide improved usability by automatically outputting a visual representation of a voice command for display when the user desires to perform an associated operation, so the user does not have to search for the appropriate voice command.

Figure 1:
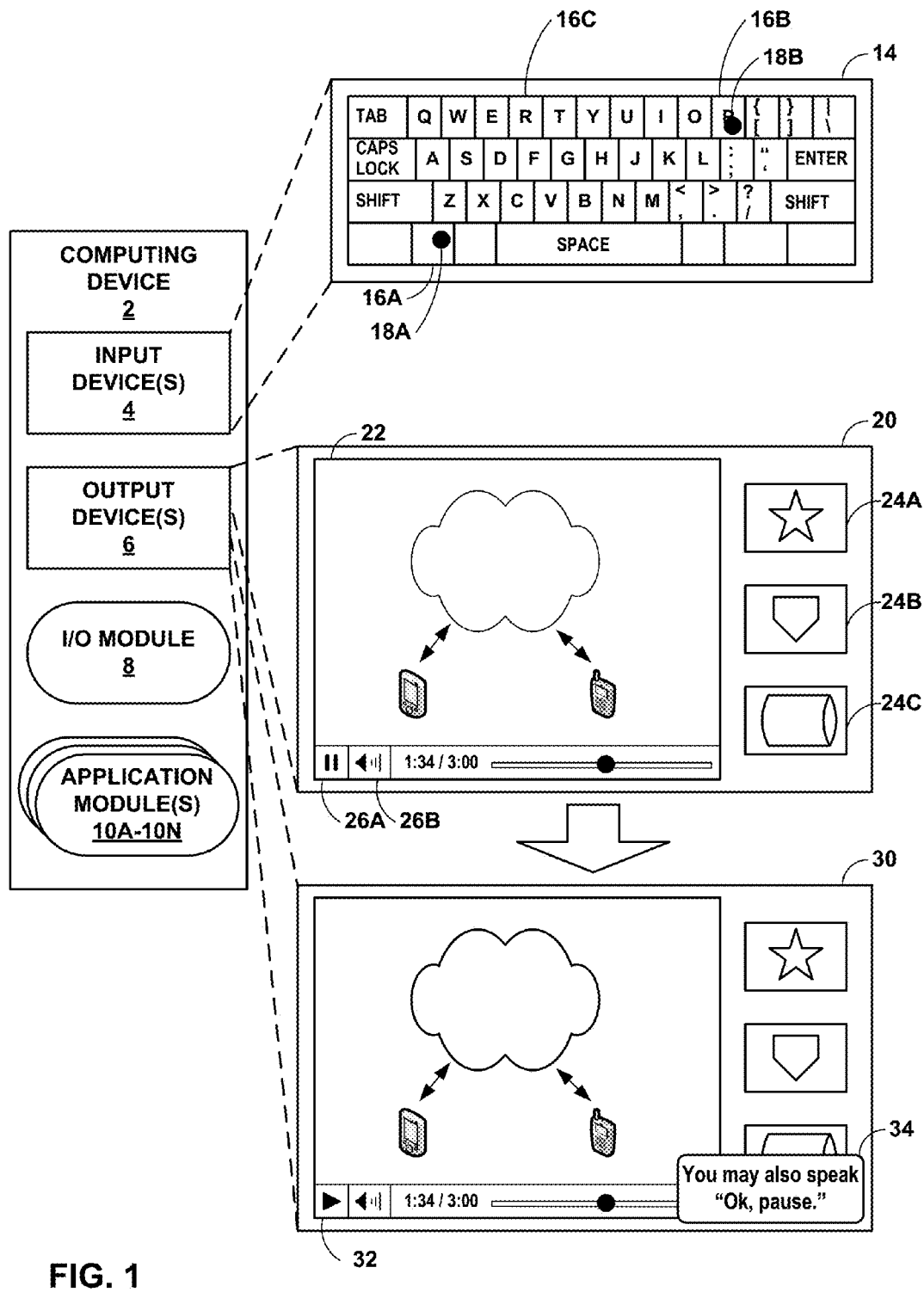
FIG. 1 is a block diagram illustrating an example computing device and graphical user interfaces (GUIs) for providing an audio input alternative for inputting a command responsive to receiving an indication of other input for the same command, in accordance with one or more aspects of the present disclosure.

FIG. 1 is a block diagram illustrating an example computing device 2 and GUIs 20, 22 for providing an audio input alternative for inputting a command responsive to receiving an indication of other input for the same command, in accordance with one or more aspects of the present disclosure. A command, generally, may be an instruction to cause a computing device to perform an associated action or operation. An operation may be the actual execution of the instruction. As shown in the example of FIG. 1, computing device 2 includes one or more input devices 4, one or more output devices 6, input/output (I/O) module 8, and application modules 10A-10N (collectively, "application modules 10"). In other examples, computing device 2 may include more or fewer components. Examples of computing device 2 may include, but are not limited to, portable, mobile, or devices, such as mobile phones (including smartphones), laptop computers, desktop computers, tablet computers, smart television platforms, personal digital assistants (PDAs), server computers, mainframes, or any other device configured to perform the techniques described herein. For instance, in the example of FIG. 1, computing device 2 may be a laptop computer.

Computing device 2, as shown in the example of FIG. 1, includes one or more input devices 4. Input devices 4 may include any device operable to receive input. Examples of input include tactile input, audio input, video input, and others. Examples of input devices 4 may include a keyboard, a mouse, a voice responsive system, a video camera, a microphone or other audio sensor, or any other type of device for detecting input (e.g., from a human or machine). As shown in the example of FIG. 1 input devices 4 may be contained within and a part of computing device 2, such as a presence-sensitive or touch-sensitive input device of a smartphone. In other examples, input devices 4 may be external to and apart from computing device 2. That is, in some examples, input devices 4 may each be a standalone device, such as a keyboard or mouse of a desktop computer, operatively coupled to computing device 2.

In the example of FIG. 1, input devices 4 include keyboard 14. Keyboard 14 may be a physical keyboard, such as an integrated keyboard of a laptop computer. As shown in the example of FIG. 1, keyboard 14 includes a number of function keys, such as key 16A, as well as keys representing letters of the English alphabet, such as keys 16B (e.g., the "P" key) and key 16C (e.g., the "R" key). In some examples, a function key may be a key not associated with an alphanumeric character. In some examples, a function key may be a key, that, when selected in combination or sequence with at least one other key, initiates a command based on the function key and the at least one other key. Examples of a function key may include an ALT key, a CTRL key, an ESC key, a Command key, or other keys. In some examples, keyboard 14 may include keys that represent letters or characters of another language, numbers, images, or any other input. While arranged in the example of FIG. 1 in the QWERTY layout, keyboard 14 may, in other examples, include keys arranged in any other format. In some examples, keyboard 14 may include more or fewer keys.

Computing device 2, as shown in the example of FIG. 1, includes one or more output devices 6. Output devices 6 may be any device operable to generate output. Examples of output include tactile output, audio output, video output, and others. Examples of output devices 6 may include a presence-sensitive display, a sound card, a speaker, a video graphics adapter card or video card, a cathode ray tube (CRT) monitor, a liquid crystal display (LCD) or other flat panel monitor, or any other type of device for generating output (e.g., to a human or machine). As shown in the example of FIG. 1, output devices 6 may be contained within and a part of computing device 2, such as a display or a speaker of a smartphone. For instance, output devices 6 may include a laptop display screen. In other examples, output devices 6 may be external to and apart from computing device 2. That is, in some examples, output devices 6 may each be a standalone device, such as a monitor or speaker system, operatively coupled to computing device 2.

In the example of FIG. 1, computing device 2 includes input/output (I/O) module 8. I/O module 8 may be operable by computing device 2 to perform one or more functions in accordance with the techniques described herein. For instance, I/O module 8 may receive indications of input (e.g., selections of keys of keyboard 14, audio input, etc.) from one or more of input devices 4 and send data to one or more other components associated with computing device 2. In some examples, indications of input may be data that represent input provided by a user and/or machine. I/O module 8 may also receive data from components associated with computing device 2 and cause other components, such as one or more of output devices 6, to provide output based on the received data. For instance, I/O module 8 may receive data from shortcut module 10 and/or application modules 12 and cause one of output devices 6 to display a GUI.

Computing device 2, in the example of FIG. 1, includes one or more application modules 10. Application modules 10 may include functionality to perform any variety of tasks on computing device 2. For instance, application modules 10 may include a word processor application, an email application, a web browser application, a multimedia player application, an alarm clock application, a calendar application, a graphic design application, a navigation or mapping application, or any other application. Additionally or alternatively, one or more of application modules 10 may be an operating system. In various examples, application modules 10 may execute at computing device 2, at a remote computing device, and/or at multiple computing devices. That is, in some examples, one or more of application modules 10 may be distributed computing applications.

In the example of FIG. 1, one of application modules 10 (e.g., application module 10A) may be a media player application. Application 10A may send information to I/O module 8 to cause one of output devices 6 to display a GUI, such as GUI 20. In some examples, GUI 20 may be the entire GUI that fills a display device, while, in other examples, GUI 20 may be only a portion of the GUI that fills a display device. In any case, GUI 20, as shown in the example of FIG. 1, includes media viewing area 22, media interaction controls 24A-24C (collectively, "media interaction controls 24"), and media playback controls 26A and 26B (collectively, "media playback controls 26"). Media viewing area 22 may be a designated area of GUI 20 for displaying visual media content, such as an image or a video. In the example of FIG. 1, media viewing area 22 may be displaying a currently playing video.

Media interaction controls 24, in the example of FIG. 1, may be associated with various commands to cause application module 10A to perform operations with respect to the currently displayed media content. In some examples, a media interaction control may be any programmable element that is visually displayable and causes application module 10A to perform one or more operations responsive to receiving a user input to interact with the programmable element. Examples of media interaction controls 24 may include but are not limited to buttons, combo boxes, lists, labels, sliders, etc. For instance, in the example of FIG. 1, media interaction control 24A may be associated with a command that causes application module 10A to assign a rating to the media content. That is, if computing device 2 receives an indication of input to select media interaction control 24A, application module 10A may cause computing device 2 to output a GUI that may be used to assign a rating to the media content. In the example of FIG. 1, media interaction controls 24B and 24C may be associated with commands that cause application module 10A to designate the media content as a favorite item and to save the media content, respectively. In other examples, media interaction controls 24 may be associated with commands that cause application module 10A to manipulate or otherwise interact with the currently displayed media content in various other ways, such as sharing the media content (e.g., via a social network or email), deleting the media content, modifying the media content, or other actions.

In the example of FIG. 1, media playback controls 26 may be associated with commands that cause application module 10A to perform operations that modify the playback of currently displayed media content, based on indications of user input. For instance, because media viewing area 22 is currently playing back a video, media playback controls 26 may affect properties of the playback, based on indications of user input to select media playback controls 26. In the example of FIG. 1, media playback control 26A may be associated with a command to cause application module 10A to toggle the currently displayed media content between a playing and paused status. That is, because media viewing area 22 is currently outputting a video, a selection of media playback control 26A may cause application module 10A to pause the video. Thereafter, a subsequent selection of media playback control 26A may cause application module 10A to resume playing the video, and so on. Media playback control 26B, in the example of FIG. 1, may be associated with a command that causes application module 10A to modify a volume at which the currently playing media content is output. That is, a selection of media playback control 26B may change the volume of audio output associated with the currently playing media content, based on an indication of user input that selects media playback control 26B. In other examples, GUI 20 may include more or fewer media playback controls that have additional or alternative functions, such as adjusting playback speed, zooming in or out of content, adjusting the playback quality, or other functions.

One or more of the commands with which media interaction controls 24 and/or media playback controls 26 are associated may, in the example of FIG. 1, be indicated by one or more shortcuts. That is, a combination or sequence of one or more indications of user input may act as a shortcut to input a command (e.g., to application module 10A) that is associated with one of media interaction controls 24 and/or media playback controls 26. In other words, a shortcut may be one or more inputs that cause computing device 2 to receive a command (e.g., a command that may be input via other methods). In some examples, a shortcut may be a single input. In other examples, the shortcut may be a plurality of inputs (e.g., 2, 3, etc.). The plurality of inputs may, in some examples, be all at the same input device. In other examples, the plurality of inputs may be at two or more input devices.

In some examples, the shortcut may be a combination of inputs, meaning that the inputs, when provided at the same time, may cause application module 10A to receive the command that the shortcut indicates. In some examples, the shortcut may be a sequence of inputs, meaning that the inputs, when provided in a particular sequence (e.g., one after the other), may cause application module 10A to receive the command. In some examples, a sequence may cause application module 10A to receive the command when the keys of the sequence are inputted within a threshold amount of time of one another (e.g., within 0.25 seconds, within 0.5 seconds, or within another threshold amount of time). In other words, shortcuts may be a single input (e.g., selection of a specialized keyboard button or key), a combination of inputs (e.g., a selection of two or more keys of a keyboard at the same time, a selection of a key of the keyboard and a selection of a mouse button at the same time, etc.), a sequence of inputs (e.g., selection and release of a first key of a keyboard then a selection and release of a second key of the keyboard, a selection and release of a mouse button then performance of a gesture at a touch-sensitive input device, etc.) or other inputs.

One or more components of computing device 2 may define relationships between inputs and various commands, thereby establishing shortcuts. For instance, I/O module 8 and/or application modules 10 may maintain data (e.g., lookup tables) that define a mapping between indications of various inputs or combinations of inputs and corresponding commands. I/O module 8 may maintain data defining system level shortcuts (e.g., a system level command lookup table) and application modules 10 may maintain data defining application level shortcuts (e.g., an application level command lookup table). System level shortcuts may be shortcuts for system level commands (e.g., commands to cause an operating system of computing device 2 to perform operations). In some examples, system level shortcuts may be available in multiple applications as well as when no applications are running. Application level shortcuts may be shortcuts for application level commands (e.g., commands to cause one of application modules 10 to perform operations). In some examples, application level shortcuts may be available when within a particular application. Furthermore, application level shortcuts may differ between different applications.

In the example of FIG. 1, for instance, the play/pause command associated with media playback control 26A may be indicated within an application level command lookup table of application module 10A by a simultaneous selection of keys 16A and 16B. That is, the application level command lookup table may include an entry that associates the play/pause command with a selection of key 16A and a selection of key 16B occurring at the same time. As another example, the application level command lookup table of application module 10A may include an entry that associates the assign rating command (e.g., the command associated with media interaction control 24A) with a selection of key 16A and a selection of key 16C occurring at the same time.

In the example of FIG. 1, one or more system level and/or application level commands may also be indicated by voice commands (e.g., audio inputs). I/O module 8 and/or application modules 10 may define relationships between audio inputs and the various commands. For instance, I/O module 8 and/or application modules 10 may maintain data (e.g., lookup tables) that define a mapping between indications of various audio inputs (e.g., data representations of the various audio inputs) and corresponding commands. I/O module 8 may maintain data defining system level audio inputs (e.g., a system level audio command lookup table) and application modules 10 may maintain data defining application level audio inputs (e.g., an application level audio command lookup table). In the example of FIG. 1, the play/pause command may be indicated by the audio input, "Ok, pause." That is, application module 10A may include an application level audio command lookup table or other data structure that associates the play/pause command with a data representation (e.g., an audio fingerprint, a set of characteristics defining the audio, etc.) of the audio input "Ok, pause."

In some examples, one or more mappings defining relationships between indications of audio input and commands may also include a textual representation of the audio input. For example, the application level audio command lookup table for application module 10A may include, in an entry for the play/pause command, the textual representation "Ok, pause." In this way, an audio command lookup table may be usable (e.g., by I/O module 8 or application modules 10) to determine the textual representation of the audio input, the data representation of the audio input, and/or the command associated with the audio input by providing another of these items.

In some examples, one or more of the application level command lookup table, the application level audio command lookup table, the system level command lookup table, and the system level audio command lookup table may be the same data structure. That is, in some examples, one or more lookup tables may be combined and usable to determine relationships between data representations of audio inputs, textual representations of the audio inputs, indications of other inputs (e.g., touch inputs), and commands associated with the inputs. In other examples, each lookup table may be a separate data structure.

In the example of FIG. 1, computing device 2 may receive a plurality of indications of user input comprising a selection of at least one key of a keyboard and at least one other user input. For instance, a user may perform a selection of key 16A at keyboard 14 (e.g., selection 18A) as well as a selection of key 16B at keyboard 14 (e.g., selection 18B). In the example of FIG. 1, selections 18A and 18B (collectively, "selections 18") may be performed at the same time. That is, the user may touch or depress key 16A and then touch or depress key 16B before ceasing to touch or releasing key 16A. In other examples, selections 18 may be received in a sequential order (e.g., one after another). For instance, the user may touch or depress key 16A and cease touching or release key 16A before touching/depressing (and then ceasing to touch/releasing) key 16B.

Responsive to receiving selections 18, keyboard 14 may, in the example of FIG. 1, send indications of selection 18A and selection 18B (collectively, "selections 18") to one or more other components of computing device 2, such as to I/O module 8. For instance, keyboard 14 may send data (e.g., a scan code) to I/O module 8 when each of selections 18 begins and/or ends. Each scan code may be a number or sequence of numbers (e.g., 1 or more bytes) that specifies an action and a physical key of keyboard 14. For instance, keyboard 14 may send a first scan code when selection 18A begins that indicates key 16A was depressed. Keyboard 14 may send a second scan code when selection 18B begins that indicates key 16B was depressed. Keyboard 14 may send a third scan code when selection 18B ends, indicating that key 16B was released, and a fourth scan code when selection 18A ends, indicating that key 16A was released.

I/O module 8 (e.g., part of an operating system of computing device 2) may receive the indications (e.g., scan codes) from keyboard 14 and may translate the received scan codes into logical data. The logical data may specify an action and a logical key that was inputted. That is, while a scan code may indicate a physical key of keyboard 14, the logical data may indicate the logical key that the key represents. For instance, I/O module 8 may translate the four received scan codes for selections 18A and 18B into logical data indicating a press of the function key, a press of the "p" key, a release of the "p" key, and a release of the function key.

In accordance with the techniques of the present disclosure, computing device 2 may determine, based at least in part on the plurality of indications of user input, that the at least one selection of the key of the keyboard and the at least one other user input collectively indicate a command for execution of at least one operation. In some examples, for instance, I/O module 8 may determine whether the logical data corresponds to a system level command. That is, I/O module 8 may compare the logical data to entries in the system level command lookup table. If an entry that includes the logical data exists in the lookup table, I/O module 8 may interpret the logical data as the corresponding system level command. Alternatively, if the system level command lookup table does not include the logical data, then I/O module 8 may determine that the logical data does not correspond to a system level command. In the example of FIG. 1, I/O module 8 may determine that the logical data representing selections 18 is not included in the system level command lookup table, and thus selections 18 do not correspond to a system level command.

Because I/O module 8 determines that the logical data representing selections 18 does not correspond to a system level command, I/O module 8 may, in the example of FIG. 1, send an indication (e.g., the logical data) of the received inputs (e.g., selections 18) to one or more of application modules 10. That is, after translating scan codes to logical data and, in some examples, determining whether the logical data indicates a system level command, I/O module 8 may send the logical data to one or more of application modules 10.

In some examples, I/O module 8 may send the logical data to a single application module while in other examples I/O module 8 may send the logical data to more than one application module. In some examples, I/O module 8 may determine to which of application modules 10 to send the logical data based on which application is the currently focused application. The currently focused application may be the application module which is currently displayed, the application module which a user of computing device 2 is currently interacting, or the application module that is currently designated as in focus by the operating system of computing device 2. In other examples, I/O module 8 may determine to which of application modules 10 to send the indication of received inputs based on the received inputs. That is, I/O module 8 may, in some examples, determine which of application modules 10 should receive the indication of input based on the input itself.

In the example of FIG. 1, I/O module 8 may send the logical data representing selections 18 to application module 10A because application module 10A is the currently focused application. Application module 10A may receive the logical data representing selections 18 and determine whether the logical data corresponds to an application level command. That is, application module 10A may compare the logical data to the application level command lookup table maintained by application module 10A to determine whether the logical data is in an entry of the lookup table. If the logical data does not exist in the application level command lookup table, application module 10A may perform one or more operations unrelated to the present disclosure, such as dismiss the received logical data, or perform other operations. If, however, application module 10A determines that the logical data does exist in the application command lookup table, application module 10A may determine that the logical data indicates the corresponding command (e.g., serves as a shortcut for entering the command). In the example of FIG. 1, application module 10A may determine, based on the logical data received from I/O module 8 and the application level command lookup table, that selections 18 collectively indicate the play/pause command associated with media playback control 26A.

Responsive to determining that the at least one selection of the key and the at least one other user input collectively indicate the command, computing device 2 may determine, in the example of FIG. 1, that the command is alternatively indicated by a particular audio input. For instance, I/O module 8 or application modules 10 may access the system level audio command lookup table or an application level audio command lookup table, respectively, to determine whether an audio input exists for the determined command.

In the example of FIG. 1, responsive to determining that selections 18 collectively indicate the play/pause command, application module 10A may determine whether the play/pause command is alternatively indicated by a particular audio input (e.g., a voice command). Application module 10A may use the application level audio command lookup table to determine if the lookup table includes the play/pause command in association with a data representation of audio input and/or a textual representation of audio input. If application module 10A fails to find the command in the application level audio command lookup table, application module 10A may perform operations specified by the command, may do nothing or may perform one or more other operations unrelated to the present disclosure.

If, however, application module 10A determines that the play/pause command is in the application level audio command lookup table, application module 10A may determine that the command may be alternatively indicated by the associated audio input. For instance, application module 10A may determine that the application level audio command lookup table includes an entry associating the play/pause command with the textual representation and data representations of the audio input, "Ok, pause." In this way, application 10A may determine that the play/pause command may be alternatively indicated by the particular audio input, "Ok, pause."

Responsive to determining that the command is alternatively indicated by the particular audio input, computing device 2 may, in the example of FIG. 1, output a visual representation of the particular audio input for display. For instance, application module 10A may determine that the play/pause command is associated with the data representation and/or textual representation of the audio input, "Ok, pause," within the application level audio input lookup table. Responsive to determining that the play/pause command is associated with the audio input "Ok, pause," application module 10A may send data (e.g., indicating the textual representation "Ok, pause") to I/O module 8 to be output for display. The data may cause one or more of output devices 6 to display notification 34 as part of GUI 30. As shown in FIG. 1, notification 34 may include a visual representation of the voice command, "Ok, pause."

In the example of FIG. 1, computing device 2 may execute, based at least in part on the command, the at least one operation. For instance, application module 10A may execute the operation or operations corresponding to the play/pause command, thereby pausing the currently playing media. As part of pausing the currently playing media, application module 10A may send data to I/O module 8 for display. I/O module 8 may receive the data from application module 10A, and responsive to receiving the data, I/O module 8 may cause one or more of output devices 6 to display GUI 30. As shown in the example of FIG. 1, GUI 30 includes media playback control 32 in place of media playback control 26A as shown in GUI 20. Media playback control 32 may visually indicate to the user that computing device 2 has executed the command, and that the currently playing media in media viewing area 22 has been paused.

In this way, techniques of the present disclosure may enable a computing device to assist users in learning available voice commands that indicate a command when the user has inputted the command using a shortcut. Thus, a computing device configured in accordance with the techniques described herein may provide users with a way to learn available audio inputs that may be relevant to the task the user is currently performing. By learning voice commands, users may, in some examples, be able to provide input more quickly and easily than providing conventional input (e.g., selecting controls displayed as part of a GUI) or shortcut input (e.g., keyboard shortcuts). Therefore, by providing an indication of a possible voice command when the user is performing a specific task, the techniques described herein may make a computing device more accessible to users and assist users in increasing efficiency.

Figure 2:
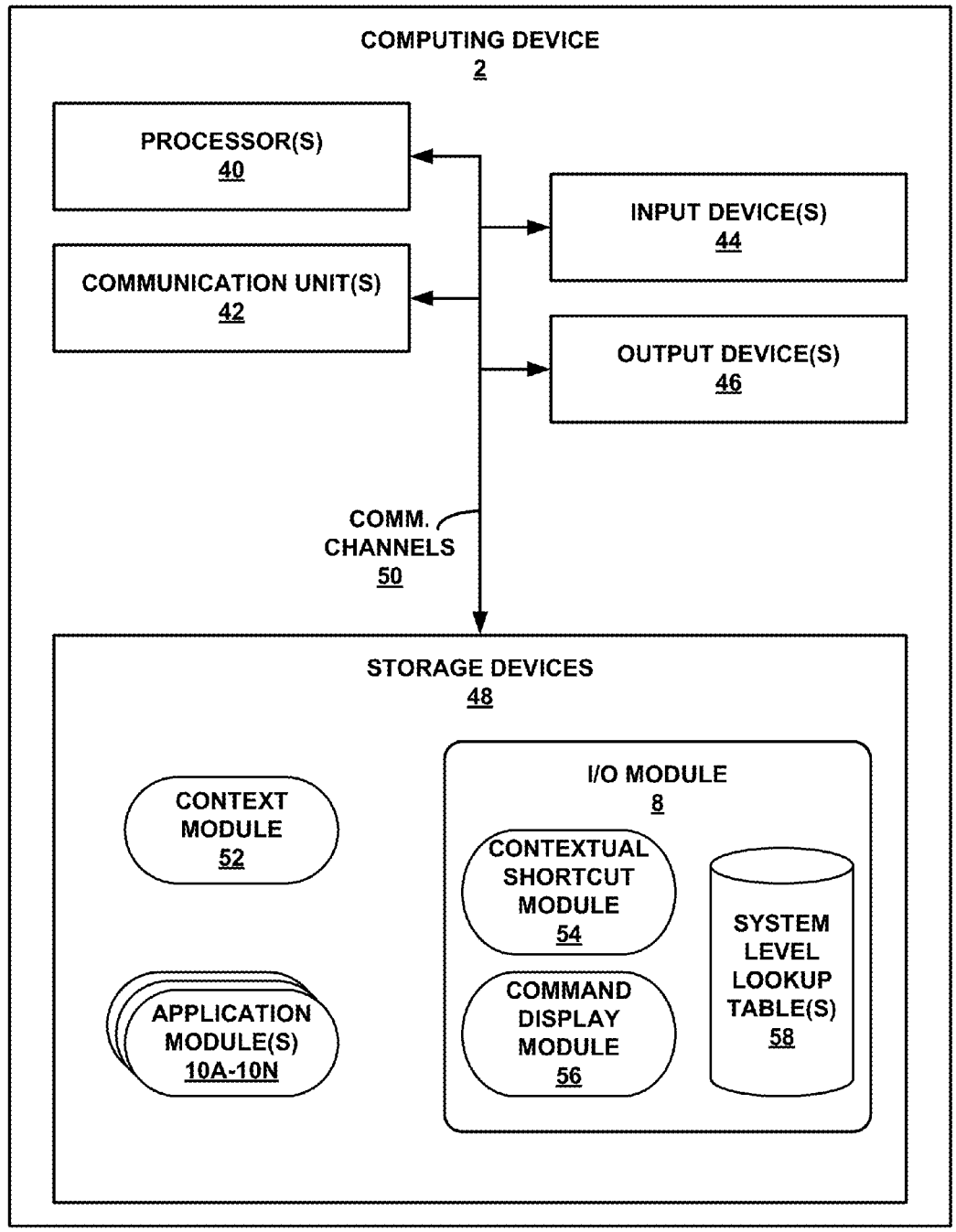
FIG. 2 is a block diagram illustrating further details of an example computing device for providing an audio input alternative for inputting a command responsive to receiving an indication of other input for the same command, in accordance with one or more aspects of the present disclosure.

FIG. 2 is a block diagram illustrating further details of one example of computing device 2 for providing an audio input alternative for inputting a command responsive to receiving an indication of other input for the same command, in accordance with one or more aspects of the present disclosure. The example of FIG. 2 is described within the context of FIG. 1. FIG. 2 illustrates only one particular example of computing device 2, and many other examples of computing device 2 may be used in other instances. In some examples, computing device 2 may include fewer components than shown in the example of FIG. 2 or additional components not shown in the example of FIG. 2.

As shown in the example of FIG. 2, computing device 2 includes one or more processors 40, one or more communications units 42, one or more input devices 44, and one or more output devices 46. Computing device 2 also includes one or more storage devices 48. Storage devices 48 include input/output (I/O) module 8, application modules 10, and context module 52. I/O module 8 further includes contextual shortcut module 54, command display module 56, and one or more system level lookup tables 58.

Communication channels (COMM. CHANNELS) 50 may interconnect components 8, 10, 40, 42, 44, 46, 48, 52, 54, 56, and/or 58 for inter-component communications (physically, communicatively, and/or operatively). In some examples, communication channels 52 may include a system bus, a network connection, an inter-process communication data structure, or any other method for communicating data.

In the example of FIG. 2, input devices 44 and output devices 46 may include functionality that is the same or similar to that of input devices 4 and output devices 6 described in the example of FIG. 1, respectively. That is, input devices 44 may include any device capable of receiving input from one or more sources (e.g., a user) and output devices 46 may include any device for providing output that can be interpreted by a human or a machine.

In some examples, input devices 44 and output devices 46 may include additional or different functionality. For instance, in some examples, input devices 44 may include a presence-sensitive or touch-sensitive display or a portion thereof (e.g., a graphical keyboard on a touch screen). The presence-sensitive or touch-sensitive display may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to output devices 46.

One or more processors 40 may, in the example of FIG. 2, implement functionality and/or execute instructions within computing device 2. For example, processors 40 may receive and execute instructions stored by storage devices 48 that implement the functionality of modules 8, 10, 52, 54, and/or 56. These instructions, executed by processors 40, may cause computing device 2 to read/write/etc. information stored within storage devices 48 during program execution. Processors 40 may execute instructions of modules 8, 10, 52, 54, and/or 56 to cause computing device 2 to receive indications of user input, determine indicated commands, display alternative inputs, and/or perform other operations. That is, modules 8, 10, 52, 54, and/or 56 may be operable by processors 40 to perform various actions or functions of computing device 2.

In the example of FIG. 2, one or more communication units 42 may be operable to communicate with external devices via one or more wired and/or wireless networks by transmitting and/or receiving network signals on the one or more networks. Examples of communication units 42 include a network interface card (e.g. such as an Ethernet card), an optical transceiver, a radio frequency transceiver, a GPS receiver, or any other type of device that can send and/or receive information. Other examples of communication units 42 may include Near-Field Communications (NFC) units, Bluetooth radios, short wave radios, cellular data radios, wireless network radios, as well as universal serial bus (USB) controllers.

While the techniques of the present disclosure are described herein as being performed by one or more components of computing device 2, any or all of the described techniques may alternatively be performed by another computing device in other examples. That is, while modules 8, 10, 52, 54, and 56 are described as being located at and stored within computing device 2, one or more components may be located at an external device or system (e.g., at another computing device, on a server system, in the "cloud," etc.). In such examples, communications units 42 may be configured to enable computing device 2 to communicate with other devices or systems to perform the techniques described herein.

One or more storage devices 48, in the example of FIG. 2, may be operable to store information for processing during operation of computing device 2. For instance, computing device 2 may store data that modules 8, 10, 52, 54, and/or 56 may access during execution at computing device 2. In some examples, storage devices 48 represent temporary memories, meaning that a primary purpose of storage devices 48 is not long-term storage. For instance, storage devices 48 of computing device 2 may be volatile memory, meaning that storage devices 48 may not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. As used herein, the term computer-readable storage medium does not refer to a transitory signal. A computer-readable storage medium may be configured to store larger amounts of information than volatile memory. As such, storage devices 48 may be configured for long-term storage of information. In some examples, storage devices 48 include non-volatile storage elements, meaning that storage devices 48 may maintain information through power on/power off cycles. Examples of non-volatile memories include magnetic hard discs, optical discs, floppy discs, flash memories, or forms of electrically programmable memories (EPROMs) or electrically erasable and programmable memories (EEPROMs). Storage devices 48 may, in some examples, store program instructions and/or information (e.g., data) associated with modules 8, 10, 52, 54, 56 and system level lookup tables 58, such as during program execution.

As shown in the example of FIG. 2, storage devices 48 include I/O module 8, application modules 10, and context module 52. In some examples, context module 52 and/or I/O module 8 may be included in an operating system executing at computing device 2. In other examples, context module 52 and/or parts of I/O module 8 may not be part of the operating system. In other words, while described in some examples as being part of an operating system executing at computing device 2, context module 52 and/or I/O module 8 may, in some examples, be separate and distinct from the operating system of computing device 2.

In accordance with the techniques described herein, I/O module 8 may be operable to receive indications of one or more inputs (e.g., from input devices 44) and translate the indications of input for use in determining whether the inputs collectively indicate a command. In some examples, an indication of input may cause computing device 2 to raise a hardware interrupt that an operating system of computing device 2 may handle in order to receive and/or utilize the corresponding input. For instance, I/O module 8 (e.g., as part of an operating system) may be configured to handle hardware interrupts by receiving the data sent by input devices 44 and storing the data to memory (e.g., in a buffer). Each time additional data is received, I/O module 8 may store the received data in memory until the data can be processed. I/O module 8 may process the stored physical input data (e.g., scan codes, mouse movement, etc.) by accessing the data and translating the data into logical data representing the input. I/O module 8 may provide the logical data to one or more other components of computing device 2, such as command display module 56.

Command display module 56, as shown in the example of FIG. 2, may be operable by processors 40 to receive indications of one or more inputs (e.g., logical data) from I/O module 8 and determine whether the inputs collectively indicate a system level command. If command display module 56 determines that the inputs collectively indicate a system level command, command display module 56 may determine whether the system level command is alternatively indicated by another form of input, such as an audio input. If command display module 56 determines that the command is alternatively indicated by another input, command display module 56 may cause one or more other components of computing device 2 to output a visual representation of the alternative input for display (e.g., at one of output devices 46). Command display module 56 may determine whether inputs collectively indicate a system level command and/or whether a system level command is alternatively indicated by another form of input by using system level lookup tables 58.

In the example of FIG. 2, system level lookup tables 58 may be one or more data structures usable to determine relationships between system level commands and associated inputs. That is, while described herein as one or more lookup tables, system level lookup tables 58 may be any data structure capable of defining relationships between system level commands and audio inputs, other forms of input (e.g., touch input), representations of the audio inputs, and/or other information pertaining to the system level command. For instance, examples of system level lookup tables 58 may include tree structures, arrays, linked lists, databases, or any other data structures. In some examples, system level lookup tables 58 may comprise a single data structure that defines relationships between commands, audio inputs, other inputs (e.g., shortcuts), textual representations of the audio and/or other inputs, and other relationships. In some examples, system level lookup tables 58 may comprise two or more data structures that together define relationships between commands and various inputs.

System level lookup tables 58 may be accessible (e.g., by modules 54, 56) to determine commands associated with specified inputs and/or inputs associated with specified commands. For instance, command display module 56 may send a request to system level lookup table to determine a command. The request may specify a plurality of inputs. If the inputs are associated with a system level command within system level lookup tables 58, system level lookup tables 58 may respond to the request with the associated system level command. Responsive to a request to determine an audio input that specifies a command, system level lookup tables 58 may respond with an audio input if the audio command is associated with the specified command. Two example entries of an example data structure of system level lookup tables 58 are given below in Table 1.

TABLE 1

| Row | SYSTEM LEVEL COMMAND | SHORTCUT | AUDIO INPUT | TEXTUAL REPRESENTATION |
|---|---|---|---|---|
| 1 | Run selected object in safe mode | [data representing a press of function key and a press of primary mouse button] | [data representing speech characteristics of audio input "Ok, run in safe mode"] | "Ok, run in safe mode" |
| 2 | Execute task manager | [data representing a press of function key then a press of escape key] | [data representing speech characteristics of audio input "Ok, open task manager"] | "Ok, open task manager" |

As shown in the example of Table 1, row one of the lookup table may define a relationship between a command to run a selected object in safe mode, logical data representing a press of a function key and a press of a mouse button, data representing speech characteristics of the audio input "Ok, run in safe mode," and a textual representation of the audio input. Row two of the example lookup table shown in Table 1 may define a relationship between a command to execute a task manager application, logical data representing a press and release of a function key then a press of an escape key, data representing speech characteristics of the audio input "Ok, open task manager," and a textual representation of the audio input. In some examples, the command to run a selected object in safe mode and/or the command to execute a task manager application may not be associated with a shortcut and/or may not be associated with an audio input.

Table 1 represents only one example of data stored in system level lookup tables 58, and various other examples are possible in accordance with the techniques described herein. For instance, in some examples, system level lookup tables 58 may include file paths or execution paths for various commands, indications of other commands related to a command, or other information. In some examples, system level lookup tables 58 (e.g., and/or application level lookup tables of application modules 10) may be user modifiable. That is, in some examples, a user of computing device 2 may modify lookup tables to change shortcuts, audio inputs, or other information associated with system level and application level commands. For instance, a user of computing device 2 may create, modify, or remove an audio input for a command, create, modify, or remove a shortcut for a command, specify other information for a command (e.g., defining when a command may be relevant or irrelevant), or otherwise modify lookup tables.

In any case, in the example of FIG. 2, command display module 56 may use system level lookup tables 58 to determine whether inputs collectively indicate a system level command and to determine whether the system level command is alternatively indicated by a particular audio input. If command display module 56 determines that the system level command is not alternatively indicated by an audio input, command display module 56 may execute operations corresponding to the system level command. That is, in various examples, if the system level command is not associated with an audio input in system level lookup tables 58, command display module 56 may perform operations associated with the command and do nothing more or perform other operations unrelated to the present disclosure. If command display module 56 determines that the inputs collectively do not indicate a system level command, command display module 56 may provide the inputs to one or more of application modules 10.

I/O module 8 may additionally or alternatively provide logical data to contextual shortcut module 54. As shown in the example of FIG. 2, contextual shortcut module 54 may be operable by processors 40 to determine whether one or more inputs indicated by the logical data correspond to at least a portion of inputs that collectively indicate a system level command. Additionally, if the inputs do correspond to a portion of one or more commands, contextual shortcut module 54 may be operable by processors 40 to cause one or more components of computing device 2 to output an indication of at least one of the corresponding commands for display. For instance, contextual shortcut module 54 may receive logical data indicating a single input at one of input devices 44. Contextual shortcut module 54 may access system level lookup tables 58 to determine whether the input corresponds to any inputs in groups of inputs that collectively indicate system level commands. That is, contextual shortcut module 54 may use system level lookup tables 58 to determine whether a received input is the start of or initial input of a shortcut for one or more system level commands.

If contextual shortcut module 54 receives a response from system level lookup tables 58 indicating that the input does correspond to a portion of inputs indicating system level commands, contextual shortcut module 54 may send information to I/O module 8 to cause one or more of output devices 46 to output an indication of at least one of the indicated system level commands for display. By providing indications of commands responsive to receiving inputs that correspond to part of the shortcuts that indicate the commands, contextual shortcut module 54 may assist users of computing device 2 in learning and inputting shortcuts. In addition to providing indications of possible system level commands that are indicated by shortcuts that include the received input, contextual shortcut module 54 may provide an indication of the input to applications 10.

Application modules 10, as shown in the example of FIG. 2, may have the same or similar functionality as described with respect to FIG. 1. That is, application modules 10 may be operable by processors 40 to receive inputs from I/O module 8 (e.g., modules 54 and/or 56) and determine whether the inputs collectively indicate an application level command. Responsive to determining that the inputs collectively indicate an application level command, application modules 10 may determine whether the application level command is alternatively indicated by another input, such as an audio input. If an application module determines that the command is alternatively indicated by a particular audio input, the application module may cause one or more other components of computing device 2 to output a visual representation of the particular audio input for display (e.g., at one of output devices 46). In some examples, application modules 10, as shown in FIG. 2, may have additional or different functionality. For instance, application modules 10 may also be operable by processors 40 to determine whether received input corresponds to a partial shortcut for one or more commands, and output an indication of at least one of the commands. That is, though not shown in FIG. 2, one or more of application modules 10 may have components providing functionality similar to that of contextual shortcut module 54, command display module 56, and system level lookup tables 58. While modules 54, 56, and lookup tables 58 operate on system level commands, the components of one of application modules 10 may operate on application level commands.

For instance, application 10A may include a command display module that determines whether received inputs collectively indicate an application level command by accessing application level lookup tables. The command display module may access the application level lookup tables to determine whether the command is alternatively indicated by an audio input. If the command is indicated by a particular audio input, the command display module of application 10A may cause a textual representation of the particular audio input to be output for display. Application 10A may additionally or alternatively include a contextual shortcut module that determines whether one or more received inputs are part of a set of inputs that collectively indicate an application level command by accessing application level lookup tables. If the received inputs are part of one or more shortcuts for application level commands, the contextual shortcut module of application 10A may cause a visual representation of at least one of the application level commands to be output for display.

Context module 52, as shown in the example of FIG. 2, may be operable by processors 40 to determine a context of computing device 2. The context of computing device 2 may include information related to a current state of computing device 2, a current state of a user of computing device 2, or any other information that may be used to determine whether or not to output representations of shortcuts or representations of audio input. For instance, context module 52 may communicate with one or more other components of computing device 2 to determine what application modules are currently installed at computing device 2, when an application module was installed at computing device 2, what application modules are currently executing at computing device 2, how many times an application module has been executed, a currently focused application module or currently focused application modules of computing device 2, etc. Further examples of contextual information determined by context module 52 may include previous commands received by an application module and/or by an operating system of computing device 2, previously received or recently received inputs, previously previous actions performed by applications or by the operating system of computing device 2, currently enabled or currently attached input devices 44, the current status of configuration options of computing device 2, or other information about computing device 2. A configuration option may be a user-configurable setting (e.g., part of one of application modules 10 or an operating system) to allow a user to modify or augment the techniques described herein. For instance, an operating system configuration option may allow the user to disable or enable display of contextually relevant shortcuts and/or visual representations of alternative inputs. Another example of a configuration option may be to disable or enable display of certain types of shortcuts or alternative inputs. Various other configuration options may be presented to a user (e.g., as part of a GUI) to allow the user of computing device 2 to specify the operation of computing device 2 when performing the techniques described herein.

In some examples, context module 52 may obtain information from one or more sensors of computing device 2 (not shown). For instance, context module 52 may determine a context of computing device 2 that includes an indication of the ambient noise level around computing device 2, an indication of the light level around computing device 2, an indication of where a user's focus is located, an indication of how computing device 2 is oriented or how computing device 2 is being held, or any other information. Various other types of contextual information may be obtained by context module 52 in accordance with the techniques described herein.

In some examples, one or more components of computing device 2 may send a request to context module 52 in order to obtain a current context. For instance, contextual shortcut module 54 and/or command display module 56 may send a request to context module 52 in order to determine whether or not to output indications of inputs (e.g., shortcuts or alternative inputs) for display.

As one example, responsive to determining one or more system level commands that are indicated by shortcuts that include the received input, contextual shortcut module 54 may send a request to context module 52. Context module 52 may send information to contextual shortcut module 54 that indicates a context of computing device 2. Responsive to receiving the context information, contextual shortcut module 54 may determine whether or not the determined system level commands are relevant to the current context of computing device 2, based on the received contextual information. If a system level command is not relevant to the current context, contextual shortcut module 54 may refrain from outputting a visual representation of the shortcut that indicates the command. For instance, contextual shortcut module 54 may receive an indication of input corresponding to a selection of the function key. Contextual shortcut module 54 may determine that the execute task manager command (among others) includes a selection of the function key. Contextual shortcut module 54 may communicate with context module 52 to obtain context information. The context information may indicate that the task manager application module is currently executing at computing device 2. Based at least in part on the context information, contextual shortcut module 54 may determine that the execute task manager command is not relevant to the current context of computing device 2, and thus may refrain from outputting a representation of the shortcut for the execute task manager command.

As another example, responsive to determining that a system level command is alternatively indicated by an alternative input (e.g., audio input), command display module 56 may send a request to context module 52 to obtain contextual information. Command display module 56 may receive contextual information from context module 52 and determine whether or not to output a representation of the audio input based on the context of computing device 2. For instance, if the received contextual information indicates that computing device 2 previously received the audio input (e.g., because the user already knows the voice command for the system level command), command display module 56 may refrain from sending a visual representation of the audio command to be output for display.

One or more of application modules 10 may send a request for contextual information to context module 52. That is, for instance, a contextual shortcut module and/or a command display module of one of application modules 10 may request contextual information from context module 52. The application module may use the received contextual information to determine whether an application level command and/or audio input corresponding to an application level command is relevant to the current context of computing device 2. By utilizing contextual information provided by context module 52, modules 10, 54, and/or 56 may provide more helpful information to a user of computing device 2 while refraining from providing unneeded and/or un-related shortcuts or audio inputs.

In accordance with techniques of the present disclosure, I/O module 8 may, in the example of FIG. 2, receive an indication of input corresponding to a selection of key of a keyboard, such as a selection of key 16A of keyboard 14. The selection of key 16A may cause keyboard 14 to send data indicating the physical action of key 16A being depressed (e.g., a scan code) to the operating system. The scan code may cause the operating system to raise a keyboard interrupt. I/O module 8 may handle the keyboard interrupt by receiving the scan code and storing the scan code to memory. I/O module 8 may then process the scan code by translating the scan code (e.g., indicating the press of key 16A) to logical data that indicates a selection of the function key. I/O module 8 may provide the logical data to contextual shortcut module 54 and/or command display module 56.

Command display module 56 may receive the logical data and access system level lookup tables 58 to determine whether the input indicates a system level command. That is, command display module 56 may determine whether pressing the function key is a shortcut for a system level command. In the example of FIG. 2, command display module 56 may determine that pressing the function key does not indicate a system level command. Consequently, command display module 56 may send an indication of the input (e.g., the logical data) to one or more of application modules 10. The application modules may use application level lookup tables to determine whether the input indicates an application level command. In the example of FIG. 2, the application modules may determine that pressing the function key does not indicate an application level command.

Contextual shortcut module 54 may receive the logical data from I/O module 8 and determine whether the input is included in any shortcuts indicating a system level command. That is, contextual shortcut module 54 may access system level lookup tables 58 to determine whether any command is indicated by a shortcut (e.g., one or more inputs) that includes the received input (e.g., a press of the function key). In the example of FIG. 2, contextual shortcut module 54 may determine that a run selected object in safe mode command and an execute task manager command are both indicated by shortcuts that include a press of the function key.

Responsive to determining that the input is included in the two system level commands, contextual shortcut module 54 may communicate with context module 52 to obtain contextual information. The obtained contextual information may indicate that computing device 2 is currently executing the task manager application. Contextual shortcut module 54 may determine, based on the contextual information, whether the run selected object in safe mode command and/or the execute task manager command is related to the current context. For instance, because the task manager application is already running, contextual shortcut module 54 may determine that the execute task manager command is not relevant to the current context of computing device 2. However, the run selected object in safe mode command may be relevant to the current context.

Responsive to determining that the run selected object in safe mode command is relevant to the current context, contextual shortcut module 54 may send data to I/O module 8 for outputting a representation (e.g. a textual representation) of the run selected object in safe mode command for display. For instance, contextual shortcut module 54 may send data to I/O module 8 and I/O module 8 may cause one or more of output devices 46 to display an overlay as part of a currently displayed GUI. The overlay may include an indication of the run selected object in safe mode command, as well as the shortcut usable to cause computing device 2 to receive the command.

In some examples, I/O module 8 may receive data to be output for display from both contextual shortcut module 54 and command display module 56. In such instance, I/O module 8 may, in some examples, output both sets of data for display. In other examples, I/O module 8 may determine which set of data to output for display. For instance, because data received from command display module 56 is related to an entered command, while data received from contextual shortcut module 54 is related to potential commands, I/O module 8 may discard the data from contextual shortcut module 54 and output the data received from command display module 56 for display. That is, in some examples, I/O module 8 may prioritize output of available alternative inputs over output of possible shortcuts that include the received input.

In the example of FIG. 2, I/O module 8 may also send the logical data to one or more of application modules 10. The application modules may receive the logical data representing the input (e.g., the press of the function key) and determine whether the input is part of a shortcut that indicates an application level command. For brevity and ease of understanding, application modules 10 may determine, in the example of FIG. 2, that a press of the function key is not part of any shortcuts indicating application level commands.

While key 16A is being held down, the user of computing device 2 may desire to input the run selected object in safe mode command (e.g., after viewing the outputted overlay showing the corresponding shortcut). Consequently, a mouse (e.g., another of input devices 44) may receive a selection of a left mouse button. The mouse may send data to computing device 2 indicating that the left button has been depressed. Receiving the data may cause the operating system of computing device 2 to raise a hardware interrupt corresponding to the input device. I/O module 8 may handle the hardware interrupt by receiving data representing the mouse click and storing the physical data to memory for processing and/or use.

I/O module 8 may process the stored physical data by retrieving the data from memory and translating the physical data to logical data. For instance, I/O module 8 may translate physical data indicating a selection of a left mouse button to logical data indicating a selection of the primary mouse button. That is, in some examples, I/O module 8 may translate the physical data to logical data by using a mapping of physical inputs (e.g., mouse keys) to logical inputs (e.g., button designations). In any case, I/O module 8 may provide the logical data to contextual shortcut module 54, command display module 56, and/or application modules 10.

Command display module 56 may receive the logical data and access system level lookup tables 58 to determine whether the input indicates a system level command. That is, command display module 56 may determine whether pressing the primary mouse button while holding the function key is a shortcut for a system level command. In the example of FIG. 2, command display module 56 may determine that pressing the primary mouse button while holding the function key indicates the run selected object in safe mode command. That is, command display module 56 may access system level lookup tables 58 and determine that a selection of the primary mouse button while holding down the function key is associated with the run selected object in safe mode command. Responsive to determining that the input collectively indicates the system level command, command display module 56 may determine whether the system level command is alternatively indicated by a particular audio input. For instance, command display module 56 may use system level lookup tables 58 to determine whether the run selected object in safe mode command is associated with a particular audio input.

In the example of FIG. 2, command display module 56 may determine that the run selected object in safe mode command is associated with an audio input (e.g., speaking the phrase "Ok, run in safe mode"). Consequently, command display module 56 may cause an operating system of computing device 2 to execute one or more operations specified by the run selected object in safe mode command. That is, computing device 2 may perform operations to run the selected object in a safe mode (e.g., with limited permissions).

Responsive to determine that the system level command is alternatively indicated by a particular audio input, command display module 56 may communicate with context module 52 to obtain contextual information. Command display module 56 may use the contextual information to determine whether the audio input is relevant to the current context of computing device 2. For instance, the contextual information may indicate that a user of computing device 2 has previously use the phrase "Ok, run in safe mode" as audio input. Based on this information, command display module 56 may determine that the audio input is not relevant to the current context, because the user is already aware of the available audio input. As another example, contextual information may indicate that the ambient noise level around computing device 2 is very loud (or very quiet). Based on this information, command display module 56 may determine that the audio input is not relevant to the current context, because the user may be unable to use the audio input. That is, command display module 56 may determine that the audio input is not relevant to the current context because the user cannot use the audio input at this time.

In the example of FIG. 2, the contextual information received from context module 52 may indicate a normal audio environment around computing device 2, and may indicate that the user has not previously used the audio input. Based on this information, command display module 56 may determine that the audio input is relevant to the current context of computing device 2. Based on the determination that the audio input is relevant to the current context, command display module 56 may output data (e.g., to I/O module 8) including a textual representation of the audio input for display. That is, command display module 56 may output data that includes the phrase "Ok, run in safe mode."

Contextual shortcut module 54 may receive the logical data from I/O module 8 and determine whether the input is a part of any shortcuts indicating a system level command. That is, contextual shortcut module 54 may access system level lookup tables 58 to determine whether any command is indicated by a shortcut (e.g., one or more inputs) that includes the received input (e.g., a press of the primary mouse button while the function key is selected). In the example of FIG. 2, contextual shortcut module 54 may determine that no commands are indicated by shortcuts that include a press of the primary mouse button while the function key is selected. That is, because the inputs collectively indicate the entire shortcut for the run selected object in safe mode command, contextual shortcut module 54 may determine that the inputs are not a part of any shortcuts for system level commands.

In the example of FIG. 2, I/O module 8 may also send the logical data to one or more of application modules 10. The application modules may receive the logical data representing the input (e.g., the press of the primary mouse button while the function key is selected) and determine whether the input is part of a shortcut that indicates an application level command. The application modules may determine, in the example of FIG. 2, that a press of the primary mouse button while the function key is selected is not part of any shortcuts indicating application level commands. One or more of application modules 10 may also determine that the input does not collectively indicate an application level command.

I/O module 8 may receive the data from command display module 56, including the textual representation of the audio input. Consequently, I/O module 8 may cause one or more of output devices 46 to display an overlay as part of a currently displayed GUI. The overlay may include the textual representation of the audio input that indicates the run selected object in safe mode command. For instance, the overlay may display text informing the user that he or she may alternatively use the audio input to cause computing device 2 to receive the run selected object in safe mode command.

By providing an indication of an alternative input usable to enter a command responsive to receiving input to enter the command, techniques of the present disclosure may assist users in providing input to a multi-modal device. That is, the techniques of the present disclosure may assist the user in learning of, remembering, and using alternative forms of input, such as audio input. Furthermore, by only providing indications of contextually relevant alternative inputs, the techniques described herein may avoid inundating users with unwanted or unneeded notifications.

In another aspect, techniques of the present disclosure may enable users to more easily interact with a computing device by providing an indication of contextually relevant shortcuts based on received input. That is, the computing device may assist users in quickly find useful shortcuts (e.g., keyboard shortcuts) by providing indications of shortcuts that may be useful or relevant in the current context of the computing device.

Figure 3:
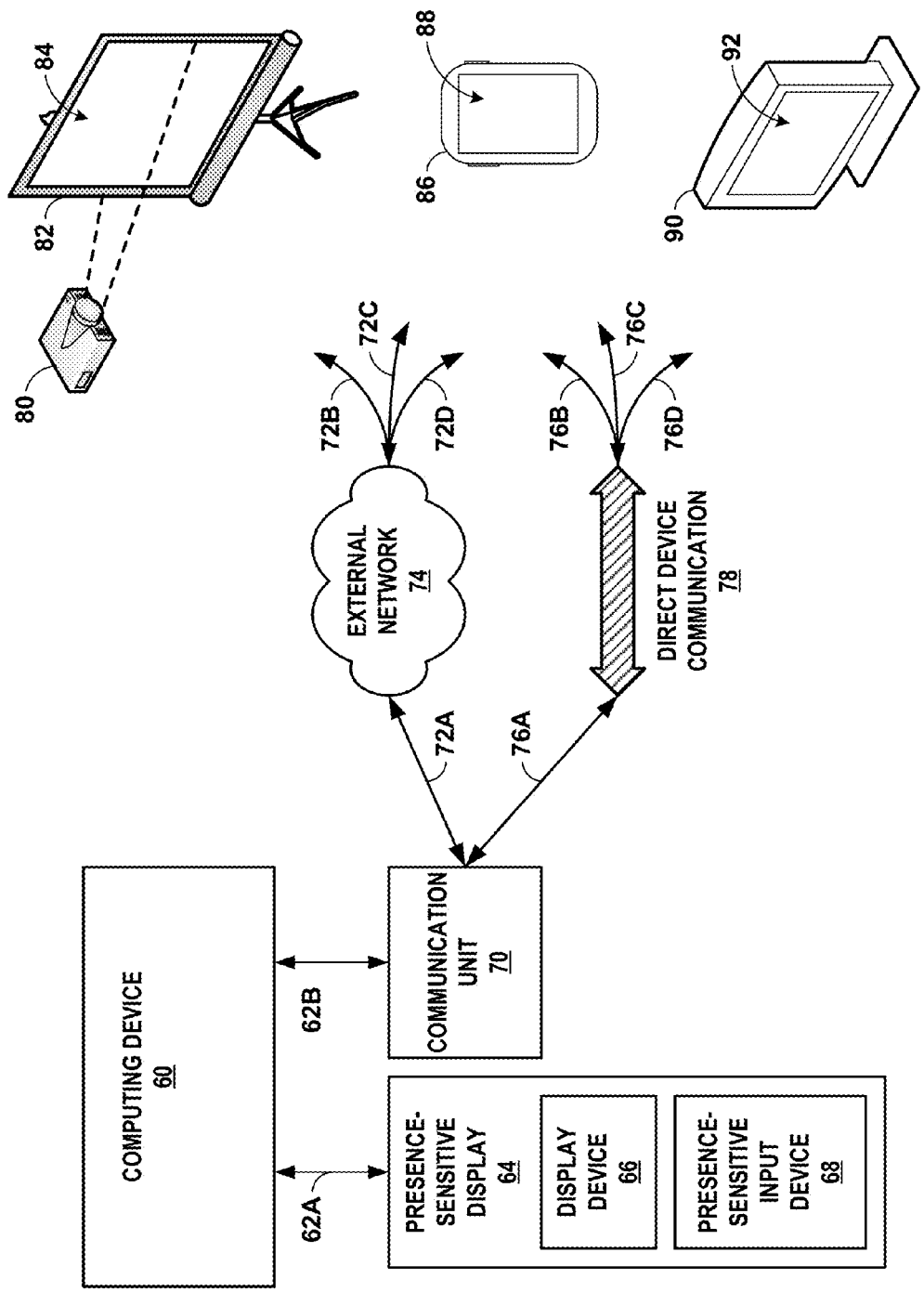
FIG. 3 is a block diagram illustrating an example computing device that outputs graphical content for display at a remote device, in accordance with one or more techniques of the present disclosure.

FIG. 3 is a block diagram illustrating an example computing device 60 that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, mainframe, etc.

Presence-sensitive display 64, as one of input devices 4 and/or output devices 6 as shown in FIG. 1, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication units 42 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of input devices 4 and/or output devices 6 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of input devices 4 and/or output devices 6 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output graphical content for display at presence-sensitive display 92. For instance, computing device 60 may send data that includes a GUI for one or more of application modules 10 to communication unit 70. Communication unit 70 may send the data that includes the GUI to visual display device 90 using external network 74. Visual display device 90, in response to receiving the data using external network 74, may cause presence-sensitive display 92 to output the GUI. In response to receiving one or more user inputs, such as a gesture at presence-sensitive display 92 (e.g., at a region of presence-sensitive display 92), visual display device 90 and other of input devices 4 may send indications of the inputs to computing device 60 using external network 74. Communication unit 70 of may receive the indications of the inputs, and send the indications to computing device 60.

In response to receiving a plurality of indications of user input comprising a selection of at least one key of a keyboard and at least one other user input, computing device 60 (e.g., I/O module 8 and/or application modules 10) may determine that the selection of the at least one key of the keyboard and the at least one other user input collectively indicate a command for execution of at least one operation. For instance, I/O module 8 may receive the plurality of indications of user input and determine that the at least one selection of the key of the keyboard and the at least one other user input collectively indicate a system level command, such as a switch focus command for changing focus from one currently executing application to a second currently executing application.

Responsive to determining that the selection of the at least one key of the keyboard and the at least one other user input collectively indicate the switch focus command, computing device 60 may determine that the switch focus command is alternatively indicated by an audio input, such as speaking the phrase, "Ok, switch to next application." Computing device 60 may execute the at least one operation by switching the focus from the currently focused application to the second application. Responsive to determining that the command is alternatively indicated by the audio input, computing device 60 may output (e.g., for display), a representation of the audio input. For instance, computing device 60 may send data for a visual representation of the phrase "Ok, switch to next application" to communication unit 70. Communication unit 70 may send the data to visual display device 90 via external network 74. Visual display device 90 may cause presence-sensitive display 92 to output the visual representation of the phrase "Ok, switch to next application" for display.

Figure 4:
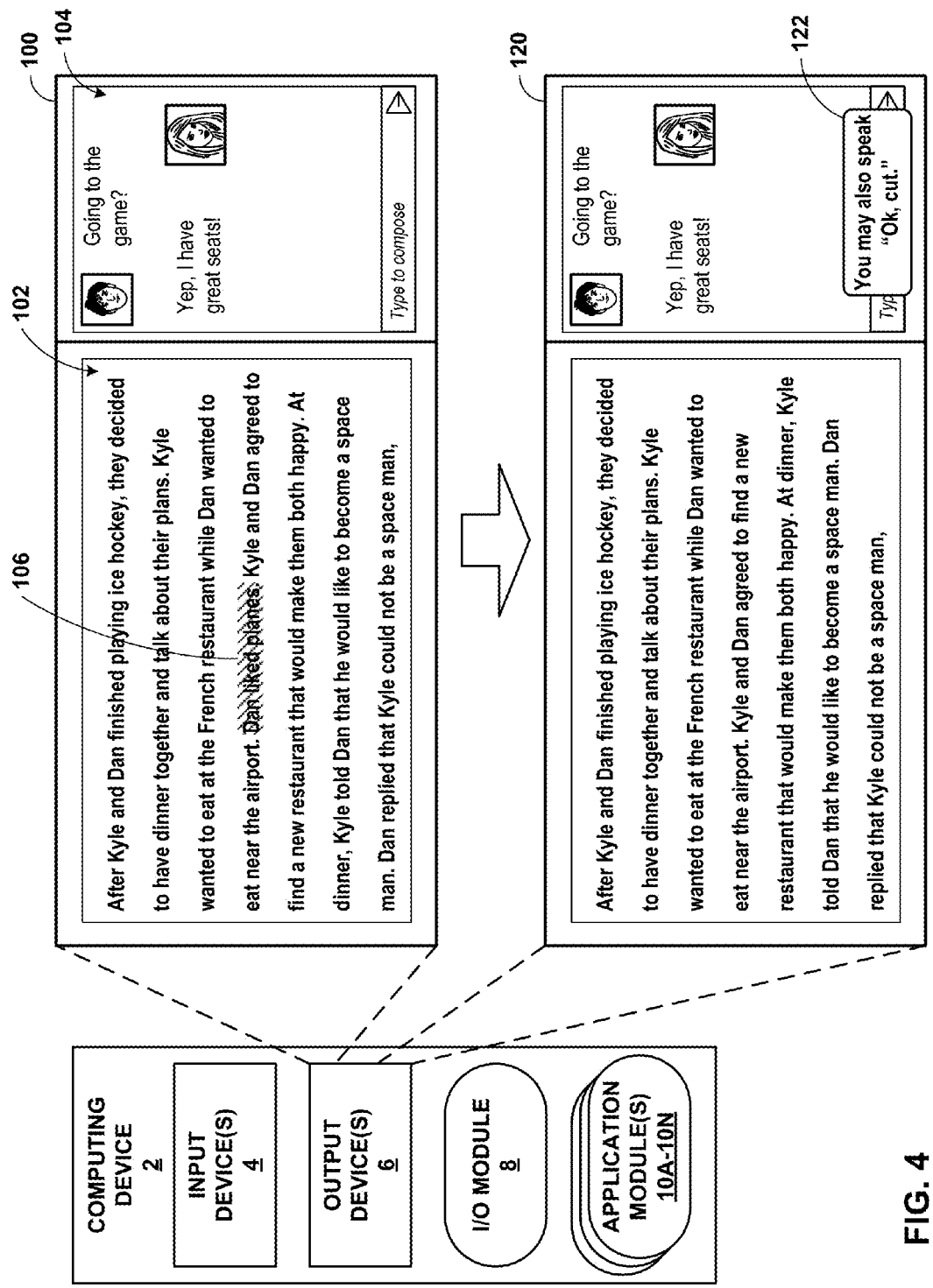
FIG. 4 is a block diagram illustrating an example computing device and GUIs for providing an audio input alternative for inputting a command responsive to receiving an indication of other input for the same command, in accordance with one or more aspects of the present disclosure.

FIG. 4 is a block diagram illustrating an example computing device and GUIs for providing an audio input alternative for inputting a command responsive to receiving an indication of other input for the same command, in accordance with one or more aspects of the present disclosure. For purposes of illustration only, the example of FIG. 4 is described below within the context of FIGS. 1 and 2. As shown in the example of FIG. 4, computing device 2 includes input devices 4, output devices 6, I/O module 8, and application modules 10. The components of computing device 2 may, in the example of FIG. 4, have functionality that is similar to or the same as that described with respect to FIGS. 1 and 2.

The example of FIG. 4 includes GUIs 100 and 120. Each of GUIs 100 and 120 may be output by computing device 2 (e.g., at one or more of output devices 6). In the example of FIG. 4, each of GUIs 100 and 120 may comprise a multi-partition GUI. For instance, GUI 100 includes main partition 102 and supplemental partition 104. Main partition 102 may include a GUI output by a word processor application (e.g., one of application modules 10). Supplemental partition 104 may include a GUI output by a messenger or chat application (e.g., another of application modules 10). In other examples, computing device 2 may output a GUI having more or fewer partitions (e.g., 1, 3, 4, or other number).

One or more of the partitions of a multi-partition GUI may be designated as an active partition. An active partition may be determined in a number of ways. For instance, the active partition may be the partition with which a user of computing device 2 is currently interacting, the partition with which the user has recently interacted, one or more recently created partitions, partitions that include unread or important material, etc. In GUI 100 of FIG. 4, the active partition may be main partition 102.

GUI 100, as shown in FIG. 4, includes text selection 106. Text selection 106 may be a visual indication that the user has selected the corresponding text within the word processor application. That is, computing device 2 may display text selection 106 as part of GUI 100 in response to receiving user input indicating the text to be selected (e.g., "Dan liked planes.").

In the example of FIG. 4, after receiving input to create selection 106, computing device 2 may receive a plurality of indications of input that collectively indicate a command. The command may alternatively be indicated by an audio input. For instance, computing device 2 may receive a plurality of indications of user input comprising a selection of at least one key of a keyboard (e.g., keyboard 14) and at least one other user input (e.g., another selection of a key of keyboard 14, a selection of a button of a mouse input device, a touch gesture performed at one of input devices 4, etc.). Computing device 2 (e.g., the word processor application) may determine, based at least in part on the plurality of indications of user input, that the selection of the at least one key of keyboard 14 and the at least one other user input collectively indicate the cut command. Receipt of the cut command may cause computing device 2 to execute at least one operation (e.g., cutting the selected object or objects) of the word processor application (e.g., one of application modules 10).

Responsive to the word processor application determining that the selection of the key of keyboard 14 and the at least one other user input collectively indicate the cut command, the word processor application may determine that the cut command is alternatively indicated by an audio input, such as a user speaking the phrase "Ok, cut." Consequently, in addition to cutting the selected object or objects, the word processor application may send a textual representation of the audio input to I/O module 8 for display.

In some examples, techniques of the present disclosure may enable one or more components of computing device 2 (e.g., I/O module 8) to determining where to display a textual representation of audio input. For instance, responsive to receiving the textual representation of the audio input, "Ok, cut," I/O module 8 may cause computing device 2 to output GUI 120 for display. As shown in GUI 120, the text included in selection 106 has been removed as a result of performing the one or more operations associated with the cut command.

As shown in the example of FIG. 4, GUI 120 includes notification 122. Notification 122 includes the textual representation of the audio input for the cut command. Responsive to receiving the textual representation of audio input from the word processor application, I/O module 8 may determine a currently active portion of GUI 100 and output the representation of the audio input (e.g., as part of notification 122) in a portion of GUI 120 other than the currently active portion. The currently active partition may, in some examples, be the partition that includes a currently focused application. In some examples, the currently active partition may be the partition which a user of computing device 2 most recently interacted (e.g., into which input was most recently provided) or the partition which a keyboard or mouse cursor currently is displayed. That is, the currently active partition may be the partition that is more likely to pertain to the current status and/or activity of computing device 2. Because main partition 102 is the currently active partition, I/O module 8 may cause notification 122 to be output in supplemental partition 104. While described in the example of FIG. 4 with respect to partitions of a GUI, techniques of the present disclosure may also be applied to un-partitioned GUIs.

By enabling a computing device to determine an active area or partition of an output GUI and output a visual representation of an alternative input in an area of the GUI other than the active area, techniques of the present disclosure may provide users with an indication of alternative inputs without causing the user to lose focus on what he or she is doing. That is, by providing the alternative input in a location other than where the user is focused, techniques of the disclosure may provide the user with the option of viewing the output representation or ignoring it.

Figure 5:
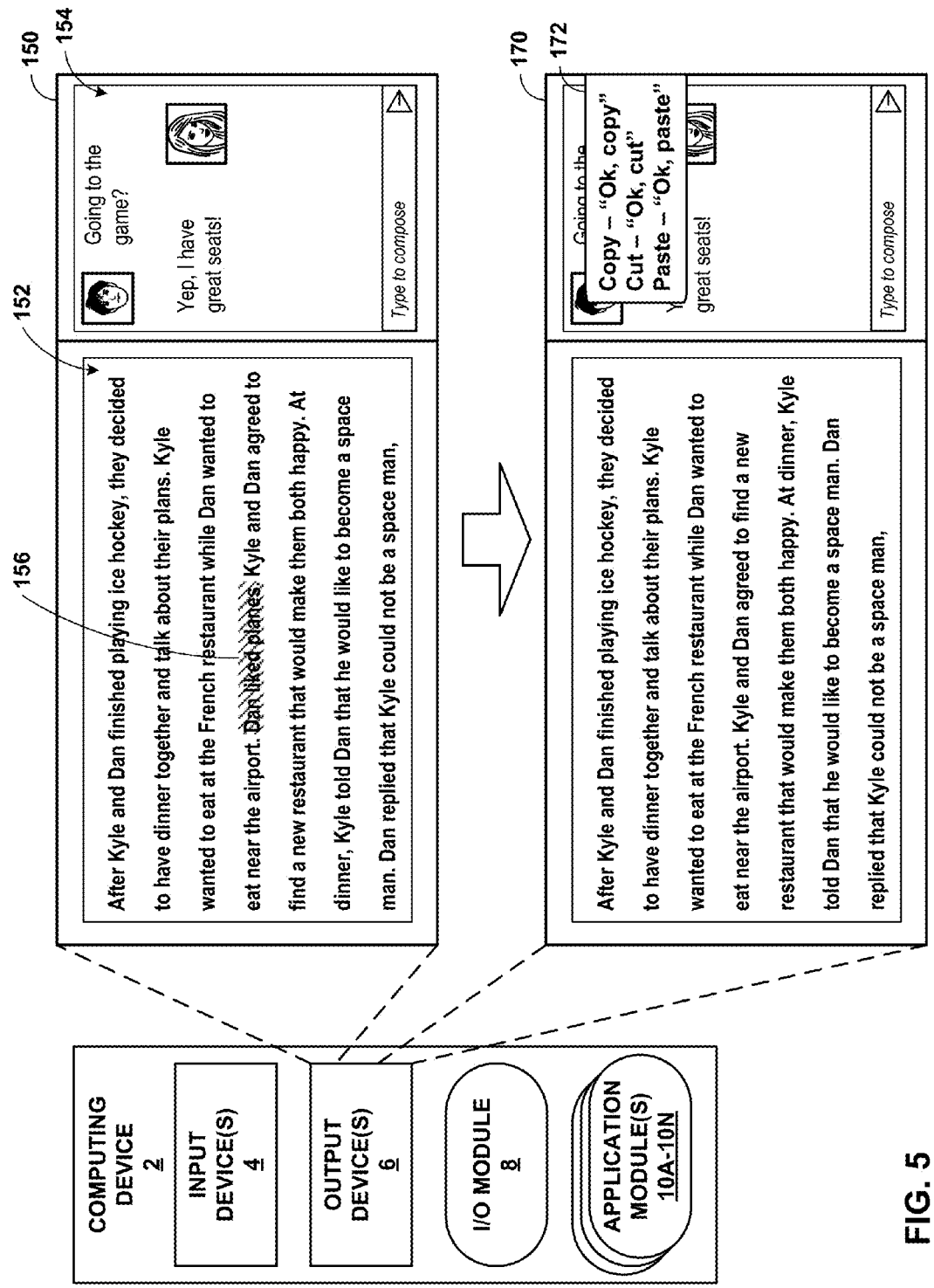
FIG. 5 is a block diagram illustrating an example computing device and GUIs for providing audio input alternatives for inputting a command responsive to receiving an indication of other input for the same command.

FIG. 5 is a block diagram illustrating an example computing device and GUIs for providing audio input alternatives for inputting a command responsive to receiving an indication of other input for the same command, in accordance with one or more aspects of the present disclosure. For purposes of illustration only, the example of FIG. 5 is described below within the context of FIGS. 1 and 2. As shown in the example of FIG. 5, computing device 2 includes input devices 4, output devices 6, I/O module 8, and application modules 10. The components of computing device 2 may, in the example of FIG. 5, have functionality that is similar to or the same as that described with respect to FIGS. 1 and 2.

The example of FIG. 5 includes GUIs 150 and 170. Each of GUIs 150 and 170 may be output by computing device 2 (e.g., at one or more of output devices 6). In the example of FIG. 5, each of GUIs 150 and 170 may comprise a multi-partition GUI including main partition 152 and supplemental partition 154. Main partition 152 may include a GUI output by a word processor application (e.g., one of application modules 10). Supplemental partition 154 may include a GUI output by a messenger or chat application (e.g., another of application modules 10). In GUI 150 of FIG. 5, main partition 152 may be the active partition.

GUI 150, as shown in FIG. 5, includes text selection 156. Text selection 156 may be a visual indication that the user has selected the corresponding text within the word processor application. That is, computing device 2 may display text selection 156 as part of GUI 150 in response to receiving user input indicating the text to be selected (e.g., "Dan liked Planes.").

In the example of FIG. 5, after receiving input to create selection 156, computing device 2 may receive a plurality of indications of input that collectively indicate a command. The command may alternatively be indicated by an audio input. For instance, computing device 2 may receive a plurality of indications of user input comprising a selection of at least one key of a keyboard (e.g., keyboard 14) and at least one other user input (e.g., another selection of a key of keyboard 14, a selection of a button of a mouse input device, a touch gesture performed at one of input devices 4, etc.). Computing device 2 (e.g., the word processor application) may determine, based at least in part on the plurality of indications of user input, that the selection of the at least one key of keyboard 14 and the at least one other user input collectively indicate the cut command. Receipt of the cut command may cause computing device 2 to execute at least one operation (e.g., cutting the selected object or objects) of the word processor application (e.g., one of application modules 10). Responsive to the word processor application determining that the selection of the key of keyboard 14 and the at least one other user input collectively indicate the cut command, the word processor application may determine that the cut command is alternatively indicated by an audio input, such as a user speaking the phrase "Ok, cut."

In the example of FIG. 5, responsive to determining that the command is alternatively indicated by an audio input, one or more components of computing device 2 may determine other audio inputs that may be contextually relevant. For instance, responsive to determining that the cut command is alternatively indicated by the audio input "Ok, cut," the word processor application may communicate with context module 52 to obtain contextual information. The word processor application may determine, based at least in part on the received contextual information, one or more other commands that are relevant to the current context of computing device 2. That is, the word processor application may determine one or more other commands that are likely to be input by the user (e.g., using a shortcut, audio input, or other input) in the current context subsequent to the word processor's receipt of input indicating the cut command. For instance, context module 52 may provide contextual information including an indication that text is currently copied to a temporary storage area (e.g., a "clipboard" of computing device 2). Based on the received information, the word processor application may determine that other commands dealing with objects at a temporary storage area, such as the copy command and the paste command, may be relevant to the current context. In other words, the word processor application may determine (e.g., based on previous usage statistics or other information) that, in a context in which objects are stored to the temporary storage area, the probability that input indicating the copy command is received is greater than a threshold probability. Therefore, the word processor application may determine that it is likely the copy command will be received subsequent to the cut command (e.g., as the next command, within the next 3 commands, within the next 5 commands, etc.) when in the current context.

The word processor application may determine audio inputs for the one or more other commands that are contextual relevant. For instance, the word processor application may access an application level lookup table to determine audio inputs for the copy command and the paste command. If the application level lookup table indicates that no corresponding audio inputs exist, the word processor application may send the textual representation of the cut command to I/O module 8 to be output for display. If, however, the application level lookup table responds with an audio input for the copy command and/or the paste command, the word processor application may provide a textual representation of the audio inputs for the copy command and/or the paste command along with the textual representation of the cut command to I/O module 8.

In the example of FIG. 5, responsive to receiving the textual representations of the audio input for the cut command, the copy command, and the paste command, I/O module 8 may cause computing device 2 to output GUI 170 for display. As shown in GUI 170, the text included in selection 156 has been removed as a result of performing the one or more operations associated with the cut command. Additionally, GUI 170 includes notification 172. Notification 172 includes the textual representations of the audio input for the cut, copy, and paste commands.

By enabling a computing device to determine contextually relevant commands and output representations of an alternative input for the contextually relevant commands, techniques of the present disclosure may provide users with timely information about available audio inputs. That is, in addition to providing an indication of an alternative input for a currently received command, techniques of the present disclosure may provide an indication of an alternative input for commands that the user may be statistically likely to perform next. In this way, the techniques described herein may allow the user to learn of alternative inputs for commands while performing related commands.

Figure 6:
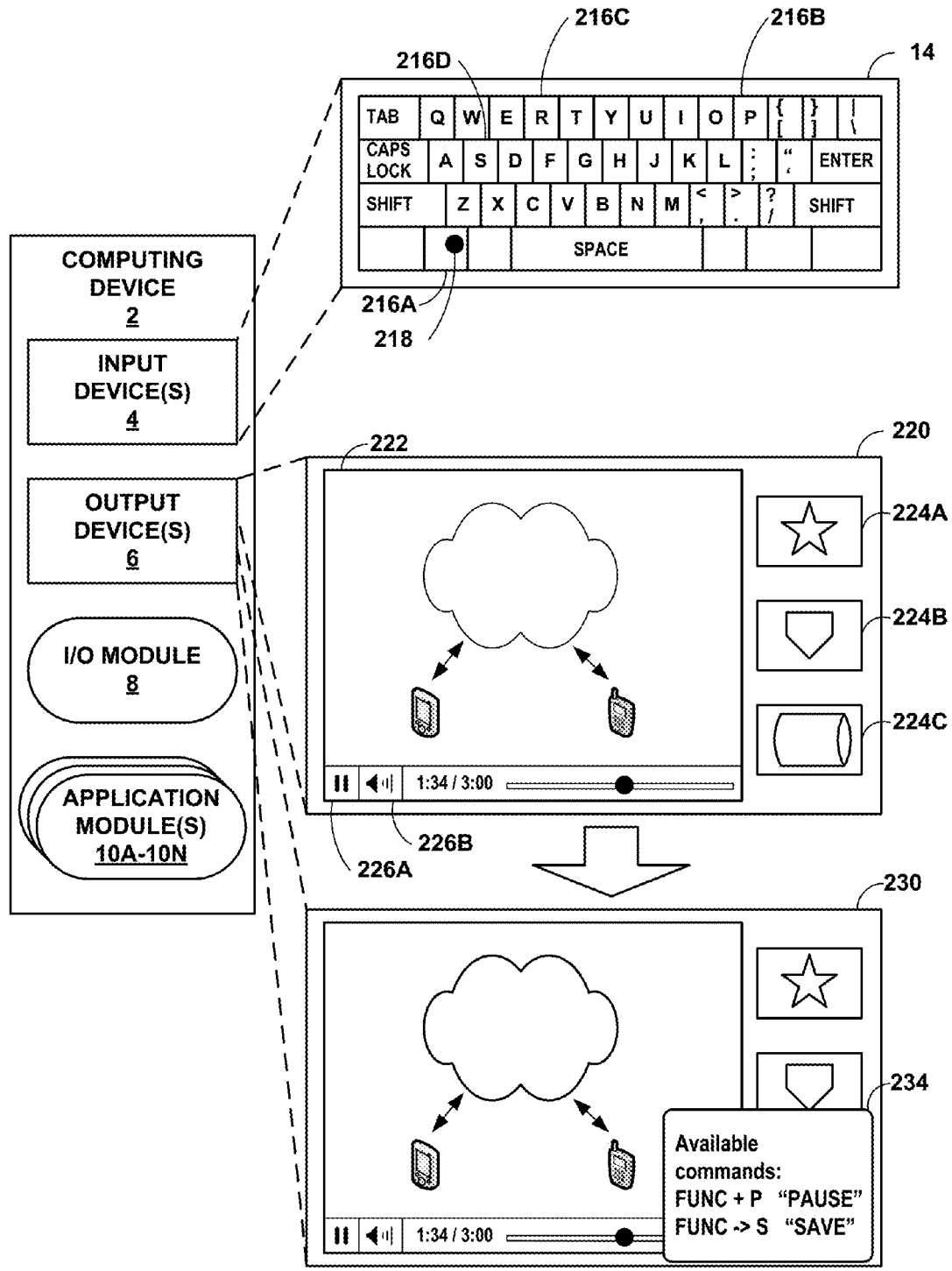
FIG. 6 is a block diagram illustrating an example computing device and GUIs for providing contextual shortcuts responsive to receiving input of a partial shortcut, in accordance with one or more aspects of the present disclosure.

FIG. 6 is a block diagram illustrating an example computing device and GUIs for providing contextual shortcuts responsive to receiving input of a partial shortcut, in accordance with one or more aspects of the present disclosure. For purposes of example only, the example of FIG. 6 is described below within the context of FIGS. 1 and 2. As shown in the example of FIG. 6, computing device 2 includes input devices 4, output devices 6, I/O module 8, and application modules 10. Output devices 6 include keyboard 14. The components of computing device 2 may, in the example of FIG. 6, have functionality that is similar to or the same as that described with respect to FIGS. 1 and 2.

As shown in the example of FIG. 6, keyboard 14 includes a number of function keys, such as key 216A (e.g., the function key), as well as keys representing letters of the English alphabet, such as keys 216B (e.g., the "P" key) and key 216C (e.g., the "R" key).

In the example of FIG. 6, one of application modules 10 (e.g., application module 10A) may be a media player application. Application 10A may send information to I/O module 8 to cause one of output devices 6 to display a GUI, such as GUI 220. GUI 220, as shown in the example of FIG. 6, includes media viewing area 222, media interaction controls 224A-224C (collectively, "media interaction controls 224"), and media playback controls 226A and 226B (collectively, "media playback controls 226"). Media viewing area 222 may be a designated area of GUI 220 for displaying visual media content, such as an image or a video. In the example of FIG. 6, media viewing area 22 may be displaying a currently playing video.

Media interaction controls 224A-C, in the example of FIG. 6, may be associated with commands to cause application module 10A to assign a rating to the media content, designate the media content as a favorite item, or save the media content, respectively. Media playback controls 226A and 226B may be associated with commands that cause application module 10A to toggle the currently displayed media content between a playing and paused status and modify a volume at which the currently playing media content is output, respectively. One or more of the commands with which media interaction controls 224 and/or media playback controls 226 are associated may, in the example of FIG. 6, be indicated by one or more shortcuts.

For instance, application module 10A may define a relationship between the play/pause command and a selection of the function key and the P key at the same time, such that a selection of key 216A and key 216B at the same time cause application module 10A to receive the play/pause command. As another example, application module 10A may define a relationship between the assign rating command and a selection of the function key and the R key at the same time. That is, responsive to receiving an indication user input corresponding to a selection of the function key and the R key at the same time, application module 10A may receive the assign rating command. Application module 10A may define a relationship between the save media command and a selection (and release) of the function key followed by a selection of the S key. That is, responsive to receiving an indication of user input corresponding to a selection and release of the function key then a selection of the S key (e.g., within a threshold amount of time), application module 10A may receive the save media command.

In the example of FIG. 6, computing device 2 may receive an indication of user input comprising a selection of at least one key of a keyboard. For instance, a user may perform a selection of key 216A at keyboard 14 (e.g., selection 218). That is, the user may touch or depress key 16A. Responsive to receiving selection 18, keyboard 14 may send an indication of selection 18 (e.g., a scan code) to one or more other components of computing device 2, such as to I/O module 8. I/O module 8 (e.g., part of an operating system of computing device 2) may receive the indication (e.g., scan code) from keyboard 14 and may translate the received scan code into logical data.

In accordance with the techniques of the present disclosure, computing device 2 may determine, based at least in part on the indication of user input, that the at least one selection of the key of the keyboard is an incomplete indication of one or more commands for execution of at least one respective operation of a respective application module. That is, system level lookup tables and/or application level lookup tables may define a relationship between a command and a set or sequence of one or more inputs that collectively indicate the command (e.g., are a shortcut for the command). An incomplete indication of the command may be a subset of the set or sequence of inputs that collectively indicate the command. In other words, input may be an incomplete indication of a command when the input is at least one of the set or sequence of inputs that indicates the command, but is not the entire set or sequence of inputs that indicates the command. For instance, if a command is indicated by three inputs, any one of the three inputs or any two of the three inputs may be an incomplete indication of the command.

In some examples, I/O module 8 may determine whether the logical data corresponds to a part of a shortcut for one or more system level commands. That is, I/O module 8 may compare the logical data to entries in the system level command lookup table. If an entry exists that includes the logical data and other data, I/O module 8 may interpret the logical data as an incomplete indication of the corresponding system level command. Alternatively, if the system level command lookup table does not include the logical data, then I/O module 8 may determine that the logical data does not correspond to a system level command. If the system level command lookup table includes the logical data as the entire shortcut for a command, I/O module 8 may determine that the logical data indicates a command and may perform one or more other operations as described herein. In the example of FIG. 6, for brevity and ease of explanation, I/O module 8 may determine that the logical data representing selection 18 is not included in the system level command lookup table, and thus selection 18 is not an incomplete indication of any system level commands. That is, I/O module 8 may determine that no system command is indicated by a shortcut that includes a selection of the function key.

Because I/O module 8 determines that the logical data representing selection 18 does not correspond to an incomplete indication of a system level command, I/O module 8 may, in the example of FIG. 1, send the logical data to one or more of application modules 10, such as application module 10A. Application module 10A may receive the logical data representing selections 18 and determine whether the logical data corresponds to an incomplete indication of one or more application level commands. That is, application module 10A may compare the logical data to the application level command lookup table maintained by application module 10A to determine whether the logical data is a portion of an entry included in the lookup table. If the logical data does not exist in the application level command lookup table, or if the logical data corresponds to a complete indication of an application level command in the application level command lookup table, application module 10A may perform one or more other operations as described herein. If, however, application module 10A determines that the logical data exists in the application command lookup table as a portion of an indication of an application level command, application module 10A may determine that the logical data is an incomplete indication of the corresponding command or commands (e.g., is part of a shortcut for entering the command or commands). In the example of FIG. 6, application module 10A may determine, based on the logical data received from I/O module 8 and the application level command lookup table, that selection 18 is an incomplete indication of the play/pause command (e.g., associated with media playback control 26A), the assign rating command (e.g., associated with media interaction control 224A), and the save media command (e.g., associated with media interaction control 224C).

In the example of FIG. 6, responsive to determining that the selection of the key is an incomplete indication of the one or more commands, computing device 2 may determine at least one contextually relevant command based at least in part on the one or more commands. For instance, I/O module 8 and/or application modules 10 may communicate with one or more other components of computing device 2 (e.g., context module 52) to obtain contextual information. Based at least in part on the received contextual information, I/O module 8 and/or application modules 10 may determine, for each of the one or more commands indicated by inputs that include the received input, whether the command is contextually relevant to the current context of computing device 2. In the example of FIG. 1, for instance, application module 10A may obtain contextual information to determine whether the play/pause command, the assign rating command, and/or the save media command is relevant to the current context of computing device 2. The contextual information may include previous actions performed by the user, indicating that the user already assigned a rating to this media item. Based on this information, application module 10A may determine that the assign rating command is not relevant to the current context. The contextual information may also include an indication that the media item is currently playing. Based on this information, application module 10A may determine that the play/pause command and the save media item command are relevant to the current context.

Computing device 2 may, in the example of FIG. 1, output a visual representation of the at least one contextually relevant command for display. For instance, application module 10A may send data including a visual representation of the play/pause command and the save media item command to I/O module 8 to be output for display. The data may cause one or more of output devices 6 to display notification 234 as part of GUI 230. As shown in FIG. 1, notification 234 includes a visual representation of the play/pause command (e.g., "PAUSE") as well as information indicating the keyboard shortcut for the play/pause command (e.g., "FUNC+P"). Notification 234 also includes a visual representation of the save media item command (e.g., "SAVE") as well as information indicating the keyboard shortcut for the save command (e.g., "FUNC->5").

In this way, techniques of the present disclosure may enable a computing device to assist users in learning shortcuts by displaying a visual representation of contextually relevant shortcuts when a user begins to input a shortcut. Thus, a computing device configured in accordance with the techniques described herein may provide users with a way to learn available shortcuts that may be relevant to the task the user is currently performing. By learning shortcuts, users may, in some examples, be able to provide input more quickly and easily than providing conventional input (e.g., selecting controls displayed as part of a GUI) or other input. Therefore, by providing an indication of contextually relevant shortcuts, the techniques described herein may make a computing device more accessible to users and increase user efficiency.

Figure 7:
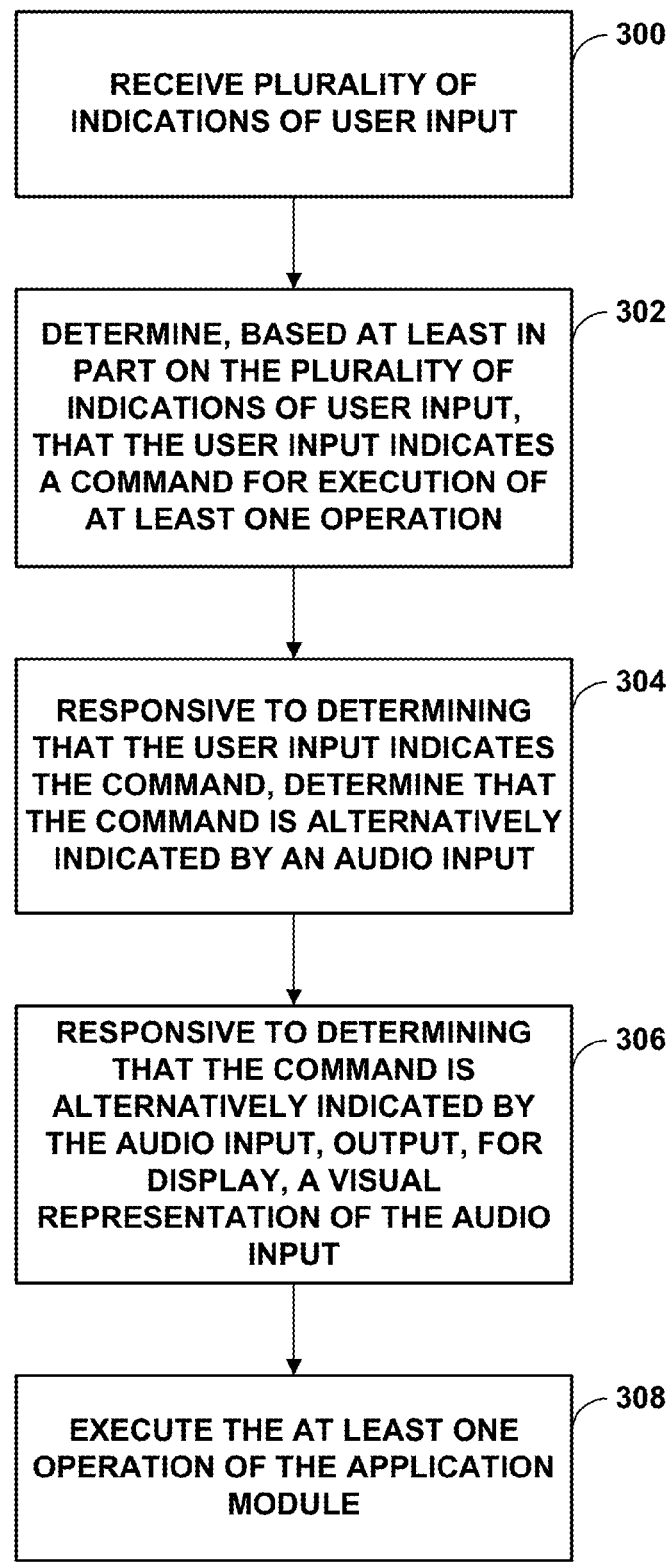
FIG. 7 is a flow diagram illustrating example operations for providing an audio input alternative for inputting a command responsive to receiving an indication of other input for the same command, in accordance with one or more aspects of the present disclosure.

FIG. 7 is a flow diagram illustrating example operations of a computing device for providing an audio input alternative for inputting a command responsive to receiving an indication of other input for the same command, in accordance with one or more aspects of the present disclosure. For purposes of illustration only, the example operations of FIG. 7 are described below within the context of FIGS. 1 and 2.

In the example of FIG. 7, computing device 2 (e.g., I/O module 8) may receiving, by a computing device, a plurality of indications of user input comprising a selection of at least one key of a keyboard and at least one other user input (300). In other words, I/O module 8 may receive an indication of input from keyboard 14 and at least one other indication of input performed at one or more of input devices 4. Based at least in part on the plurality of indications of user input, computing device 2 (e.g., one or more components of I/O module 8 and/or application modules 10) may determine that the selection of the least one key of the keyboard and the at least one other user input collectively indicate a command for execution of at least one operation (302). For instance, command display module 56 may use system level lookup tables 58 to determine that the user input collectively indicates a system level command (e.g., a command to cause an operating system application module to execute at least one operation). In other examples, one or more of application modules 10 may use application level lookup tables to determine that the user input collectively indicates an application level command (e.g., a command to cause application modules other than the operating system to execute at least one operation).

Responsive to determining that the selection of the at least one key and the at least one other user input collectively indicate the command, computing device 2 may determine that the command is alternatively indicated by a particular audio input (304). For instance, command display module 56 and/or application modules 10 may use system level lookup tables 58 or application level lookup tables, respectively, to determine that the command is alternatively indicated by the audio input.

Responsive to determining that the command is alternatively indicated by the particular audio input, computing device 2 may output, for display, a visual representation of the particular audio output (306). For instance, command display module 56 and/or one or more of application modules 10 may output a visual representation of the audio output to I/O module 8 to cause one or more of output devices 6 to display the visual representation as part of a GUI. Computing device 2 may execute the at least one operation (308). For instance, if command display module 56 determines that the user input collectively indicates a system command, command display module 56 may cause an operating system application module to execute the corresponding operation or operations. If another of application modules 10 determines that the user input collectively indicates an application level command, the application may execute the corresponding operation or operations.

The example operations of FIG. 7 may also be described by one or more of the examples below.

Example 1

A method comprising: receiving, by a computing device, a plurality of indications of user input comprising a selection of at least one key of a keyboard and at least one other user input; determining, by the computing device and based at least in part on the plurality of indications of user input, that the selection of the at least one key of the keyboard and the at least one other user input collectively indicate a command for execution of at least one operation; responsive to determining that the selection of the at least one key and the at least one other user input collectively indicate the command, determining, by the computing device, that the command is alternatively indicated by a particular audio input; responsive to determining that the command is alternatively indicated by the particular audio input, outputting, by the computing device and for display, a visual representation of the particular audio input; and executing, by the computing device and based at least in part on the command, the at least one operation.

Example 2

The method of example 1, further comprising: responsive to determining that the at least one selection of the key and the at least one other user input collectively indicate the command, determining a context of the computing device; determining, based at least in part on the context of the computing device, at least one related command, the at least one related command indicated by a particular related audio input, wherein the at least one related command is related to the command based on the context; and responsive to determining the at least one related command, outputting, by the computing device and for display, a visual representation of the particular related audio input.

Example 3

The method of example 2, wherein determining the context of the computing device comprises determining at least one of: an application module installed at the computing device, an application module currently executing at the computing device, a currently focused application module, a previous action performed by the computing device, data that indicates a user of the computing device, data that indicates a current focus of the user of the computing device, or a configuration option of the computing device.

Example 4

The method of any of examples 1-3, further comprising: responsive to determining that the command is alternatively indicated by the particular audio input, outputting, by the computing device, an audio representation of the particular audio input.

Example 5

The method of any of examples 1-4, wherein the plurality of indications of user input comprises a plurality of indications of first user input, the method further comprising: responsive to outputting the visual representation of the particular audio input, receiving, by the computing device, an indication of second user input comprising the particular audio input; responsive to receiving the indication of second user input, receiving, by the computing device, a plurality of indications of third user input comprising the selection of the at least one key of the keyboard and the at least one other user input; and responsive to receiving the plurality of indications of third user input, determining, based at least in part on the indication of second user input, to refrain from outputting the visual representation of the particular audio input.

Example 6

The method of any of examples 1-5, further comprising outputting, by the computing device and for display, a graphical user interface comprising a plurality of partitions, each respective partition of the plurality of partitions comprising a non-overlapping region of the graphical user interface, wherein outputting the visual representation of the particular audio input comprises: determining a currently active partition from the plurality of partitions; and outputting the visual representation of the particular audio input at a partition from the plurality of partitions other than the active partition.

Example 7

The method of any of examples 1-6, wherein determining that the selection of the at least one key of the keyboard and the at least one other user input collectively indicate the command for execution of the at least one operation comprises at least one of: determining, by an operating system of the computing device, that the selection of the at least one key of the keyboard and the at least one other user input collectively indicate a system level command for execution of at least one operation of the operating system; or determining, by an application module, that the selection of the at least one key of the keyboard and the at least one other user input collectively indicate an application level command for execution of at least one operation of the application module.

Example 8

The method of any of examples 1-7, wherein the at least one other user input comprises a selection of a second key of the keyboard.

Example 9

A method comprising: receiving, by a computing device, an indication of user input comprising a selection of at least one key of a keyboard; determining, by the computing device and based at least in part on the indication of user input, that the at least one selection of the key of the keyboard is an incomplete indication of one or more commands for execution of at least one respective operation; responsive to determining that the selection of the key is an incomplete indication of the one or more commands, determining, by the computing device and based at least in part on the one or more commands, at least one contextually relevant command; and outputting, by the computing device and for display, a visual representation of the at least one contextually relevant command.

Example 10

The method of example 9, wherein determining that the at least one selection of the key of the keyboard is the incomplete indication of the one or more commands comprises determining commands that are each indicated by a respective set of inputs such that the at least one selection of the key of the keyboard comprises a subset of the respective set of inputs.

Example 11

The method of example 10, wherein the subset of the respective set of inputs does not comprise the set of inputs.

Example 12

The method of example 9, wherein determining at least one contextually relevant command comprises determining a current context of the computing device and determining at least one command that is statistically likely to be received by the computing device in the current context.

Example 13

The method of example 12, wherein determining the current context comprises determining at least one of: an application module installed at the computing device, an application module currently executing at the computing device, a currently focused application module, a command previously received by the computing device, a previous action performed by the computing device, data that indicates a user of the computing device, data that indicates a current focus of the user of the computing device, or a configuration option of the computing device.

Example 14

The method of example 9, wherein determining at least one contextually relevant command comprises: determining a most recently received command; determining at least one previous time at which the most recently received command was input; determining one or more temporally related commands, wherein the one or more temporally related commands comprise commands received within a threshold time of the at least one previous time at which the most recently received command was input, and comparing the one or more commands to the one or more temporally related commands to determine the at least one contextually relevant command.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device, a plurality of indications of user input comprising a selection of at least one key of a keyboard and at least one other user input;
after receiving the plurality of indications of user input, determining, by the computing device and based at least in part on the plurality of indications of user input, that the selection of the at least one key of the keyboard and the at least one other user input collectively indicate a command for execution of at least one operation;
responsive to determining that the selection of the at least one key and the at least one other user input collectively indicate the command, determining, by the computing device, that the command is alternatively indicated by a particular audio input;
responsive to determining that the command is alternatively indicated by the audio input, outputting, by the computing device and for display, a visual representation of the particular audio input; and
executing, by the computing device and based at least in part on the command, the at least one operation.

2. The method of claim 1, further comprising:
responsive to determining that the at least one selection of the key and the at least one other user input collectively indicate the command, determining a context of the computing device;
determining, based at least in part on the context of the computing device, at least one related command, the at least one related command indicated by a particular related audio input, wherein the at least one related command is related to the command based on the context; and
responsive to determining the at least one related command, outputting, by the computing device and for display, a visual representation of the particular related audio input.

3. The method of claim 2, wherein determining the context of the computing device comprises determining at least one of: an application module installed at the computing device, an application module currently executing at the computing device, a currently focused application module, a previous action performed by the computing device, data that indicates a user of the computing device, data that indicates a current focus of the user of the computing device, or a configuration option of the computing device.

4. The method of claim 1, further comprising:
responsive to determining that the command is alternatively indicated by the particular audio input, outputting, by the computing device, an audio representation of the particular audio input.

5. The method of claim 1, wherein the plurality of indications of user input comprises a plurality of indications of first user input, the method further comprising:

responsive to outputting the visual representation of the particular audio input, receiving, by the computing device, an indication of second user input comprising the particular audio input;

responsive to receiving the indication of second user input, receiving, by the computing device, a plurality of indications of third user input comprising the selection of the at least one key of the keyboard and the at least one other user input; and responsive to receiving the plurality of indications of third user input, determining, based at least in part on the indication of second user input, to refrain from outputting the visual representation of the particular audio input.

6. The method of claim 1, further comprising outputting, by the computing device and for display, a graphical user interface comprising a plurality of partitions, each respective partition of the plurality of partitions comprising a non-overlapping region of the graphical user interface, wherein outputting the visual representation of the particular audio input comprises:
determining a currently active partition from the plurality of partitions; and
outputting the visual representation of the particular audio input at a partition from the plurality of partitions other than the currently active partition.

7. The method of claim 1, wherein determining that the selection of the at least one key of the keyboard and the at least one other user input collectively indicate the command for execution of the at least one operation comprises at least one of:

determining, by an operating system of the computing device, that the selection of the at least one key of the keyboard and the at least one other user input collectively indicate a system level command for execution of at least one operation of the operating system; or determining, by an application module, that the selection of the at least one key of the keyboard and the at least one other user input collectively indicate an application level command for execution of at least one operation of the application module.

8. The method of claim 1, wherein the at least one other user input comprises a selection of a second key of the keyboard.

9. A computing device comprising:
at least one processor; and
at least one module operable by the at least one processor to:
receive a plurality of indications of user input comprising a selection of at least one key of a keyboard and at least one other user input;
after receiving the plurality of indications of user input, determine, based at least in part on the plurality of indications of user input, that the selection of the at least one key of the keyboard and the at least one other user input collectively indicate a command for execution of at least one operation;
responsive to determining that the selection of the at least one key and the at least one other user input collectively indicate the command, determine that the command is alternatively indicated by a particular audio input;

responsive to determining that the command is alternatively indicated by the particular audio input, output, for display, a visual representation of the particular audio input; and execute, based at least in part on the command, the at least one operation.

10. The computing device of claim 9, wherein the at least one module is further operable by the at least one processor to:

responsive to determining that the at least one selection of the key and the at least one other user input collectively indicate the command, determine a context of the computing device;

determine, based at least in part on the context of the computing device, at least one related command, the at least one related command indicated by a particular related audio input, wherein the at least one related command is related to the command based on the context; and responsive to determining the at least one related command, output, for display, a visual representation of the particular related audio input.

11. The computing device of claim 10, wherein the at least one module operable to determine the context of the computing device is operable to determine at least one of: an application module installed at the computing device, an application module currently executing at the computing device, a currently focused application module, a previous action performed by the computing device, data that indicates a user of the computing device, data that indicates a current focus of the user of the computing device, or a configuration option of the computing device.

12. The computing device of claim 9, wherein the at least one module is further operable by the at least one processor to:

responsive to determining that the command is alternatively indicated by the particular audio input, output an audio representation of the particular audio input.

13. The computing device of claim 9, wherein the plurality of indications of user input comprises a plurality of indications of first user input, and wherein the at least one module is further operable by the at least one processor to:

responsive to outputting the visual representation of the particular audio input, receive an indication of second user input comprising the particular audio input;

responsive to receiving the indication of second user input, receive a plurality of indications of third user input comprising the selection of the at least one key of the keyboard and the at least one other user input; and responsive to receiving the plurality of indications of third user input, determine, based at least in part on the indication of second user input, to refrain from outputting the visual representation of the particular audio input.

14. The computing device of claim 9, wherein the at least one module is further operable by the at least one processor to output, for display, a graphical user interface comprising a plurality of partitions, each respective partition of the plurality of partitions comprising a non-overlapping region of the graphical user interface, and wherein the at least one module operable to output the visual representation of the particular audio input is operable to:

determine a currently active partition from the plurality of partitions; and output the visual representation of the particular audio input at a partition from the plurality of partitions other than the currently active partition.

15. The computing device of claim 9, wherein the at least one module operable to determine that the selection of the at least one key of the keyboard and the at least one other user input collectively indicate the command for execution of the at least one operation comprises at least one of:
- an operating system of the computing device, wherein the operating system is operable to determine that the selection of the at least one key of the keyboard and the at least one other user input collectively indicate a system level command for execution of at least one operation of the operating system; or
- an application module of the computing device, wherein the application module is operable to determine that the selection of the at least one key of the keyboard and the at least one other user input collectively indicate an application level command for execution of at least one operation of the application module.

16. The computing device of claim 9, wherein the at least one other user input comprises a selection of a second key of the keyboard.

17. A non-transitory computer-readable storage medium encoded with instructions that, when executed, cause at least one processor to:
- receive a plurality of indications of user input comprising a selection of at least one key of a keyboard and at least one other user input;
- after receiving the plurality of indications of user input, determine, based at least in part on the plurality of indications of user input, that the selection of the at least one key of the keyboard and the at least one other user input collectively indicate a command for execution of at least one operation;
- responsive to determining that the selection of the at least one key and the at least one other user input collectively indicate the command, determine that the command is alternatively indicated by a particular audio input;
- responsive to determining that the command is alternatively indicated by the particular audio input, output, for display, a visual representation of the particular audio input; and
- execute, based at least in part on the command, the at least one operation.

18. The non-transitory computer-readable storage medium of claim 17, wherein the at least one processor comprises at least one processor of a computing device, the computer-readable storage medium being further encoded with instructions that, when executed, cause the at least one processor to:
- responsive to determining that the at least one selection of the key and the at least one other user input collectively indicate the command, determine a context of the computing device;
- determine, based at least in part on the context of the computing device, at least one related command, the at least one related command indicated by a particular related audio input, wherein the at least one related command is related to the command based on the context; and
- responsive to determining the at least one related command, output, by the computing device and for display, a visual representation of the particular related audio input.

19. The non-transitory computer-readable storage medium of claim 18, wherein the instructions that cause the at least one processor to determine the context of the computing device comprise instructions that cause the at least one processor to determine at least one of: an application module installed at the computing device, an application module currently executing at the computing device, a currently focused application module, a previous action performed by the computing device, data that indicates a user of the computing device, data that indicates a current focus of the user of the computing device, or a configuration option of the computing device.

20. The non-transitory computer-readable storage medium of claim 18, wherein the plurality of indications of user input comprises a plurality of indications of first user input, the computer-readable storage medium being further encoded with instructions that, when executed, cause the at least one processor to:
- responsive to outputting the visual representation of the particular audio input, receive an indication of second user input comprising the particular audio input;
- responsive to receiving the indication of second user input, receive a plurality of indications of third user input comprising the selection of the at least one key of the keyboard and the at least one other user input; and
- responsive to receiving the plurality of indications of third user input, determine, based at least in part on the indication of second user input, to refrain from outputting the visual representation of the particular audio input.

* * * * *